(12) United States Patent
Zhang et al.

(10) Patent No.: US 12,512,560 B2
(45) Date of Patent: Dec. 30, 2025

(54) INORGANIC COATING LAYER CROSSLINKED SEPARATOR

(71) Applicant: Asahi Kasei Battery Separator Corporation, Tokyo (JP)

(72) Inventors: Xun Zhang, Tokyo (JP); Shinji Moritani, Tokyo (JP)

(73) Assignee: Asahi Kasei Battery Separator Corporation, Tokyo (JP)

( * ) Notice: Subject to any disclaimer, the term of this patent is extended or adjusted under 35 U.S.C. 154(b) by 627 days.

(21) Appl. No.: 17/791,305

(22) PCT Filed: Jan. 8, 2021

(86) PCT No.: PCT/JP2021/000586
§ 371 (c)(1),
(2) Date: Jul. 7, 2022

(87) PCT Pub. No.: WO2021/141132
PCT Pub. Date: Jul. 15, 2021

(65) Prior Publication Data
US 2023/0046375 A1    Feb. 16, 2023

(30) Foreign Application Priority Data

Jan. 8, 2020    (JP) ................. 2020-001619
Apr. 13, 2020   (JP) ................. 2020-071854

(51) Int. Cl.
*H01M 50/449*    (2021.01)
*B32B 27/32*     (2006.01)
(Continued)

(52) U.S. Cl.
CPC ........... *H01M 50/449* (2021.01); *B32B 27/32* (2013.01); *H01G 11/52* (2013.01); *H01M 50/417* (2021.01)

(58) Field of Classification Search
CPC ............. H01M 50/449; H01M 50/417; H01M 50/451; H01M 50/446; H01M 50/489; B32B 27/32; H01G 11/52; Y02E 60/10
See application file for complete search history.

(56) References Cited

U.S. PATENT DOCUMENTS

2007/0184340 A1    8/2007   Ichikawa et al.
2010/0221965 A1    9/2010   Katayama et al.
(Continued)

FOREIGN PATENT DOCUMENTS

CN    102367172 A    3/2012
CN    102888016 A    1/2013
(Continued)

OTHER PUBLICATIONS

Translation of EP3473631A1 (Year: 2019).*
(Continued)

*Primary Examiner* — Nicholas A Smith
*Assistant Examiner* — Seamus Patrick McNulty
(74) *Attorney, Agent, or Firm* — Morgan, Lewis & Bockius LLP

(57) ABSTRACT

There is provided a separator for an electricity storage device, comprising a polyolefin resin microporous membrane and an inorganic porous layer arranged on at least one surface of the polyolefin resin microporous membrane, wherein
   the inorganic porous layer has at least one selected from the group consisting of (i) covalent bonding between inorganic particles, (ii) covalent bonding between resin binders, and (iii) covalent bonding between an inorganic particle and a resin binder, and
   the polyolefin resin microporous membrane comprises a silane graft-modified polyolefin, and a silane crosslinking reaction in the silane graft-modified polyolefin is
(Continued)

initiated when the separator for an electricity storage device is brought into contact with an electrolyte solution.

18 Claims, 2 Drawing Sheets

(51) Int. Cl.
*H01G 11/52* (2013.01)
*H01M 50/417* (2021.01)

(56) References Cited

U.S. PATENT DOCUMENTS

| | | | |
|---|---|---|---|
| 2013/0244080 A1 | 9/2013 | Song et al. | |
| 2013/0252066 A1 | 9/2013 | Yeou et al. | |
| 2013/0280584 A1 | 10/2013 | Matsumura | |
| 2014/0023922 A1 | 1/2014 | Isshiki et al. | |
| 2014/0272532 A1 | 9/2014 | Park et al. | |
| 2014/0308565 A1* | 10/2014 | Lee | H01M 4/622 |
| | | | 429/144 |
| 2014/0342226 A1 | 11/2014 | Sasaki et al. | |
| 2015/0056492 A1 | 2/2015 | Huang | |
| 2016/0126518 A1 | 5/2016 | Park et al. | |
| 2018/0212219 A1 | 7/2018 | Kim et al. | |
| 2020/0067054 A1 | 2/2020 | Kim et al. | |
| 2020/0176742 A1 | 6/2020 | Fukunaga et al. | |
| 2020/0266411 A1 | 8/2020 | Lee et al. | |
| 2023/0046375 A1 | 2/2023 | Zhang et al. | |

FOREIGN PATENT DOCUMENTS

| | | | | |
|---|---|---|---|---|
| CN | 103339757 | A | 10/2013 | |
| CN | 104205417 | A | 12/2014 | |
| CN | 104812579 | A | 7/2015 | |
| CN | 110621731 | A | 12/2019 | |
| CN | 112049449 | A | 12/2020 | |
| EP | 3340343 | A1 | 6/2018 | |
| EP | 3473631 | A1 * | 4/2019 | ............ B01J 31/28 |
| JP | 2008-287888 | A | 11/2008 | |
| JP | 2011-071128 | A | 4/2011 | |
| JP | 2013-0197092 | A | 9/2013 | |
| JP | 2013-0197100 | A | 9/2013 | |
| JP | 2014-112480 | A | 6/2014 | |
| JP | 2014-179321 | A | 9/2014 | |
| JP | 2015-211006 | A | 11/2015 | |
| JP | 2015-230796 | A | 12/2015 | |
| JP | 2016-012478 | A | 1/2016 | |
| JP | 2016-213019 | A | 12/2016 | |
| JP | 6187464 | B2 | 8/2017 | |
| JP | 2017-203145 /3 | | 11/2017 | |
| JP | 6346986 | B1 | 6/2018 | |
| JP | 2020-031047 | A | 2/2020 | |
| JP | 7461381 | B2 | 4/2024 | |
| KR | 10-2015-0021557 | A | 3/2015 | |
| KR | 10-2016-0129583 | A | 11/2016 | |
| KR | 10-2016-0131761 | A | 11/2016 | |
| KR | 10-2017-0044996 | A | 4/2017 | |
| KR | 101943491 | B1 | 1/2019 | |
| KR | 10-2043387 | B1 | 11/2019 | |
| WO | 2012/073996 | A1 | 6/2012 | |
| WO | 2012/099264 | A1 | 7/2012 | |
| WO | 2013/080938 | A1 | 6/2013 | |
| WO | 2019/240475 | A1 | 12/2019 | |

OTHER PUBLICATIONS

Supplementary European Search Report issued in European Patent Application No. 21737963.5 dated Jul. 1, 2024.
International Search Report issued in corresponding International Patent Application No. PCT/JP2021/000586 dated Mar. 18, 2021.
International Preliminary Report on Patentability and Written Opinion issued in corresponding International Patent Application No. PCT/JP2021/000586 dated Jul. 21, 2022.

* cited by examiner

INORGANIC COATING LAYER CROSSLINKED SEPARATOR

FIELD

The present invention relates to a separator for an electricity storage device. More specifically, the present invention relates to a separator for an electricity storage device, comprising an inorganic coating layer (inorganic porous layer) forming a crosslinked structure.

BACKGROUND

Microporous membranes are widely used as separation or selective permeation separation membranes for various substances and separation materials. Examples for use thereof include microfiltration membranes, separators for fuel cells and capacitors, base materials of functional membranes for filling pores with functional materials to develop new functions, and separators for electricity storage devices. Of these, polyolefin resin microporous membranes are suitably used as separators for lithium-ion secondary batteries (LIBs), which are widely mounted in laptop computers, mobile phones, and digital cameras, and constituent materials thereof.

For the purpose of improving heat resistance, a separator comprising a crosslinked coating layer (for example, an inorganic porous layer comprising inorganic particles and a resin binder) on the surface of a microporous membrane has been proposed (refer to PTLs 1 to 5). In order to ensure the safety of the battery, forming a crosslinked structure in the microporous membrane by ring-opening of norbomene by ultraviolet or electron beam irradiation has also been proposed (refer to PTL 6).

CITATION LIST

Patent Literature

[PTL 1] Japanese Patent Publication No. 6187464
[PTL 2] WO 2013/080938
[PTL 3] Japanese Unexamined Patent Publication (Kokai) No. 2015-211006
[PTL 4] Japanese Unexamined Patent Publication (Kokai) No. 2008-287888
[PTL 5] Japanese Unexamined Patent Publication (Kokai) No. 2014-179321
[PTL 6] Japanese Unexamined Patent Publication (Kokai) No. 2011-071128

SUMMARY

Technical Problem

In recent years, there have been progress in the high densification and the high energy densification of LIBs, such that the cycle characteristic and the safety (for example, safety evaluated by a battery destruction test) in LIBs are expected to be further improved, and further improvements are also expected for the separator for LIBs. However, the separators described in PTLs 1 to 5 still have room for improvement from the viewpoint of improving the performance described above for LIBs. Further, when a crosslinked structure is formed in the microporous membrane by light irradiation as described in PTL 6, the light irradiation is non-uniform and the crosslinked structure may become non-uniform, which is considered to be caused by the periphery of the crystal portion of the resin constituting the microporous membrane being easily crosslinked by light. When a microporous membrane having a non-uniform crosslinked structure is used as a separator for an LIB, the LIB may be deformed when heated. Such a problem is not limited to separators for LIBs, but is also present in separators for electricity storage devices typified by LIBs.

In view of the above problem, it is an object of the present invention to provide a separator for an electricity storage device capable of further improving the performance (for example, the cycle characteristic and the safety evaluated by device destruction or heating test) of the electricity storage device. In addition, it is an object of the present invention to provide a secondary battery and an electricity storage device, comprising such a separator for an electricity storage device.

Solution to Problem

The present inventors have intensively studied and consequently discovered that the above object can be achieved by incorporating a polyolefin resin microporous membrane comprising a silane graft-modified polyolefin and a crosslinked inorganic porous layer arranged on at least one surface thereof in a separator for an electricity storage device, and/or arranging the inorganic porous layer on the polyolefin resin microporous membrane and controlling the peeling ratio of the inorganic porous layer from the polyolefin resin microporous membrane in a solvent immersion test within a predetermined range, thus completing the present invention. Specifically, the present invention is described as follows:

(1)
A separator for an electricity storage device, comprising a polyolefin resin microporous membrane and an inorganic porous layer arranged on at least one surface of the polyolefin resin microporous membrane, wherein
the inorganic porous layer has at least one selected from the group consisting of (i) covalent bonding between inorganic particles, (ii) covalent bonding between resin binders, and (iii) covalent bonding between an inorganic particle and a resin binder, and
the polyolefin resin microporous membrane comprises a silane graft-modified polyolefin, and a silane crosslinking reaction in the silane graft-modified polyolefin is initiated when the separator for an electricity storage device is brought into contact with an electrolyte solution.

(2)
The separator for an electricity storage device according to item 1, wherein the electrolyte solution is nonaqueous and contains a fluorine (F)-containing lithium salt.

(3)
The separator for an electricity storage device according to item 1 or 2, wherein the polyolefin resin microporous membrane comprises a polyolefin other than the silane graft-modified polyolefin.

(4)
The separator for an electricity storage device according to any one of items 1 to 3, wherein the inorganic porous layer comprises a crosslinked structure.

(5)
A separator for an electricity storage device, comprising a polyolefin resin microporous membrane and an inorganic porous layer arranged on at least one surface of the polyolefin resin microporous membrane, wherein in a solvent immersion test, an area where the inorganic porous layer is peeled from the polyolefin resin microporous membrane is 0 to 35% based on the area of the inorganic porous layer before the test.

(6)

The separator for an electricity storage device according to item 5, wherein the inorganic porous layer has at least one selected from the group consisting of (i) covalent bonding between inorganic particles, (ii) covalent bonding between resin binders, and (iii) covalent bonding between an inorganic particle and a resin binder.

(7)

The separator for an electricity storage device according to item 6, wherein the inorganic porous layer comprises a crosslinked structure formed by at least one selected from the group consisting of the covalent bonding (i) to (iii).

(8)

The separator for an electricity storage device according to any one of items 5 to 7, wherein the polyolefin resin microporous membrane comprises a silane graft-modified polyolefin.

(9)

The separator for an electricity storage device according to item 8, wherein a silane crosslinking reaction in the silane graft-modified polyolefin is initiated when the separator for an electricity storage device is brought into contact with an electrolyte solution.

(10)

The separator for an electricity storage device according to item 9, wherein the electrolyte solution is nonaqueous and contains a fluorine (F)-containing lithium salt.

(11)

The separator for an electricity storage device according to any one of items 8 to 10, wherein the polyolefin resin microporous membrane comprises a polyolefin other than the silane graft-modified polyolefin.

(12)

The separator for an electricity storage device according to any one of items 5 to 11, wherein a region facing the inorganic porous layer of the polyolefin resin microporous membrane has a surface roughness of 0.2 to 3.0 µm.

(13)

The separator for an electricity storage device according to item 4 or 7, wherein the crosslinked structure in the inorganic porous layer is formed by at least one selected from the group consisting of a nucleophilic substitution reaction, a nucleophilic addition reaction, an electrophilic addition reaction, and a silane coupling reaction.

(14)

The separator for an electricity storage device according to any one of items 1 to 4, 6, 7, and 13, wherein the resin binder is in the form of an emulsion, a suspension, or a colloid.

(15)

The separator for an electricity storage device according to any one of items 1 to 4, 6, 7, 13, and 14, wherein the resin binder has a nucleophilic substitution- or nucleophilic addition-reactive functional group.

(16)

The separator for an electricity storage device according to any one of items 1 to 4, 6, 7, and 13 to 15, wherein the nucleophilic substitution- or nucleophilic addition-reactive functional group of the resin binder is at least one selected from the group consisting of a carboxyl group, a hydroxy group, and an amino group.

(17)

The separator for an electricity storage device according to any one of items 1 to 16, wherein the inorganic porous layer comprises an inorganic particle and has a polar functional group on a surface of the inorganic particle.

(18)

The separator for an electricity storage device according to any one of items 1 to 17, wherein the inorganic porous layer comprises an inorganic particle and has a silicon-containing functional group on a surface of the inorganic particle.

(19)

The separator for an electricity storage device according to item 18, wherein a silicon-containing functional group is at least one selected from the group consisting of an alkoxysilane group, a halogen-substituted silane group, and a silazane group.

(20)

The separator for an electricity storage device according to any one of items 1 to 19, wherein the inorganic porous layer comprises a crosslinking agent.

(21)

The separator for an electricity storage device according to item 20, wherein the crosslinking agent has a nucleophilic substitution-reactive functional group and/or an electrophilic addition-reactive functional group.

(22)

The separator for an electricity storage device according to item 20 or 21, wherein the crosslinking agent has a nucleophilic substitution-reactive functional group and an electrophilic addition-reactive functional group.

(23)

The separator for an electricity storage device according to item 21 or 22, wherein the nucleophilic substitution-reactive functional group of the crosslinking agent is an oxazoline group and/or an epoxy group.

(24)

The separator for an electricity storage device according to item 21 or 22, wherein the electrophilic addition-reactive functional group of the crosslinking agent is at least one selected from the group consisting of an isocyanate group, a thioisocyanate group, a carbodiimide group, an allene group, an oxime group, and a carbonyl group.

(25)

The separator for an electricity storage device according to any one of items 20 to 24, wherein the inorganic porous layer comprises an inorganic particle and a resin binder; has a polar functional group on a surface of the inorganic particle; and has the crosslinking agent between the polar functional group and the resin binder, and a crosslinked structure is formed by covalent bonding between the polar functional group, the crosslinking agent, and the resin binder.

(26)

The separator for an electricity storage device according to any one of items 20 to 25, wherein the crosslinking agent is in the form of an emulsion, a suspension, or a colloid.

(27)

An electricity storage device comprising an electrode, an electrolyte solution, and the separator for an electricity storage device according to any one of items 1 to 26.

(28)

A secondary battery comprising an electrode, an electrolyte solution, and the separator for an electricity storage device according to any one of items 1 to 26.

Advantageous Effects of Invention

According to the present invention, a separator for an electricity storage device capable of further improving the performance (for example, the cycle characteristic and the safety evaluated by device destruction or heating test) of an electricity storage device can be provided. In addition, according to the present invention, a secondary battery and an electricity storage device, comprising such a separator, can be provided.

DESCRIPTION OF EMBODIMENTS

Figure 1:
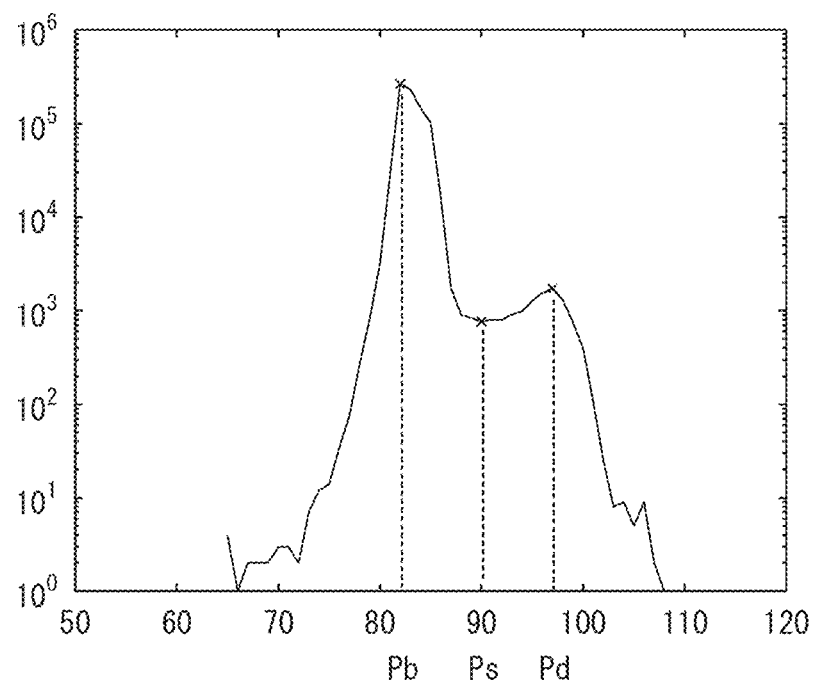
FIG. 1 is a drawing showing an example of a histogram used to derive the percentage (%) of peeled area, according to one embodiment of the present invention.

Hereinafter, embodiments of the present invention (referred to as "present embodiments") will be described. However, the present invention is not limited thereto, and can be modified as appropriate without departing from the spirit of the invention. In the present specification, the numerical values at both ends of "to" are included as the upper limit value and the lower limit value, unless specified otherwise. In addition, the upper limit value and the lower limit value of a numerical range in the present specification can be optionally combined. Moreover, the term "separator for an electricity storage device" may be referred to as "separator" for short hereinafter.

<Separator for Electricity Storage Device>

The separator for an electricity storage device can be used in an electricity storage device, for example, can be arranged between positive and negative electrodes of the electricity storage device.

Embodiment 1

The separator for an electricity storage device according to Embodiment 1 comprises a polyolefin resin microporous membrane, comprising a silane graft-modified polyolefin and an inorganic porous layer arranged on at least one surface thereof, and may further comprise a layer other than the polyolefin resin microporous membrane and the inorganic porous layer as desired. The inorganic porous layer can be arranged on both surfaces of the polyolefin resin microporous membrane, or the inorganic porous layer can be arranged on one surface of the polyolefin resin microporous membrane and a layer other than the polyolefin resin microporous membrane and the inorganic porous layer can be arranged on the other surface of the polyolefin resin microporous membrane.

The inorganic porous layer of the separator according to Embodiment 1 has at least one selected from the group consisting of (i) covalent bonding between inorganic particles, (ii) covalent bonding between resin binders, and (iii) covalent bonding between an inorganic particle and a resin binder, and when the separator according to Embodiment 1 is brought into contact with an electrolyte solution, a silane crosslinking reaction in a silane graft-modified polyolefin contained in the polyolefin resin microporous membrane is initiated.

The inorganic porous layer according to Embodiment 1 is arranged on at least one surface of the polyolefin resin microporous membrane. Therefore, a state in which the inorganic porous layer is arranged on only one surface of the polyolefin resin microporous membrane and a state in which the inorganic porous layer is arranged on both surfaces of the polyolefin resin microporous membrane are both included in the scope of Embodiment 1. When the inorganic porous layer is arranged on both surfaces of the polyolefin resin microporous membrane, inorganic porous layers having an identical configuration or inorganic porous layers having different configurations may be arranged thereon.

The inorganic porous layer according to Embodiment 1 may comprise an inorganic particle and/or a resin binder.

The inorganic porous layer according to Embodiment 1 may form a crosslinked structure by any of the covalent bonding (i) to (iii) or include a crosslinked structure.

The above description does not mean that a crosslinked structure is always formed between inorganic particles. For example, when a crosslinked structure is formed between an inorganic particle and a resin binder, it is not necessary for a crosslinked structure to be formed between inorganic particles. Similarly, the above description does not mean that a crosslinked structure is always formed between resin binders. For example, when a crosslinked structure is formed between an inorganic particle and a resin binder, it is not necessary for a crosslinked structure to be formed between resin binders.

In other words, at least one of the above crosslinked structures may be formed in the inorganic porous layer. However, from the viewpoint of facilitating the demonstration of the effect of the present invention, it is preferable that crosslinked structures of all of the covalent bonding (i) to (iii) be formed.

In Embodiment 1, the covalent bonding between inorganic particles, the covalent bonding between resin binders, and the covalent bonding between an inorganic particle and a resin binder include cases in which a crosslinking agent intervenes therebetween as needed.

The polyolefin resin microporous membrane according to Embodiment 1 comprises a silane graft-modified polyolefin as the polyolefin resin, and may comprise a polyolefin other than the silane graft-modified polyolefin or an additional component as desired. Since the silane graft-modified polyolefin can undergo crosslinking when the separator according to Embodiment 1 is brought into contact with an electrolyte solution, the timing of the silane crosslinking reaction can be controlled. Thus, for example, it is possible to carry out a crosslinking reaction in the manufacturing process for an electricity storage device or by arranging the separator in the electricity storage device, without carrying out a crosslinking reaction in the manufacturing process for the separator, thereby avoiding production failure of the separator and achieving safety (for example, the safety evaluated by device destruction or heating test), improved cycle characteristic, and high output of the electricity storage device. From the viewpoint of the silane crosslinking reaction, the electrolyte solution brought into contact with the silane graft-modified polyolefin is preferably nonaqueous, and/or preferably contains a fluorine (F)-containing lithium salt.

Embodiment 2

The separator for an electricity storage device according to Embodiment 2 comprises a polyolefin resin microporous membrane and an inorganic porous layer arranged on at least one surface thereof, and may comprise a layer other than the polyolefin resin microporous membrane and the inorganic porous layer as desired. The inorganic porous layer can be arranged on both surfaces of the polyolefin resin microporous membrane, or the inorganic porous layer can be arranged on one surface of the polyolefin resin microporous membrane and a layer other than the polyolefin resin microporous membrane and the inorganic porous layer can be arranged on the other surface of the polyolefin resin microporous membrane.

In a solvent immersion test of the separator according to Embodiment 2, the area where the inorganic porous layer is peeled from the polyolefin microporous membrane is 0 to 35% based on the area of the inorganic porous layer before the test. When the area is set to 35% or less, it is possible to suppress the adverse effect on the charging and discharging reactions and the reliability of the electricity storage device by the inorganic porous layer peeled from the polyolefin microporous membrane in an electrolyte solution. As a result, a separator capable of further improving the performance (for example, the cycle characteristic and the safety of a battery evaluated by a destructive test or heating test of a device) of an electricity storage device can be provided. The area is measured in accordance with the method described in the Examples.

The significance of the solvent immersion test described in the Examples is as follows.

Generally, the electrolyte solution used in a battery is a mixed solution of a cyclic alkane carbonate such as propylene carbonate and a linear alkane carbonate such as ethyl methyl carbonate. Further, each battery manufacturer adjusts the functional groups and mixture thereof each time in accordance with battery design. Accordingly, the SP (solubility parameter) value of the electrolyte solution changes, and thus infiltration of the electrolyte solution into the inorganic porous layer, swelling of the inorganic porous layer, and peeling due to the structural destruction of the inorganic porous layer cannot be unambiguously evaluated. Therefore, in order to appropriately evaluate the area described above, the solvent immersion test described in the Examples can be carried out. For example, acetone is a solvent which has a lower molecular weight than various electrolyte solutions and has an aprotic polar functional group. In the solvent immersion test, using a solvent having a comparatively low molecular weight (such as acetone), it was experimentally found that the solvent can infiltrate into the inorganic porous layer to easily swell the inorganic porous layer and cause peeling due to the structural destruction of the inorganic porous layer. Thus, when satisfactory evaluation results are obtained in the solvent immersion test described in the Examples, the separator can be determined to be stable even in other electrolyte solutions.

One of the factors controlling the area of the inorganic porous layer peeled from the polyolefin microporous membrane includes the control of the crosslinked structure in the inorganic porous layer. Specifically, the area can be controlled by controlling the items relating to the inorganic porous layer described in Tables 3 to 6 of the Examples.

When the crosslinked structure is not formed in the organic porous layer, the resin binder in the inorganic porous layer swells with the electrolyte solution, and it is highly likely that the swollen resin binder is dislodged from the inorganic porous layer into the electrolyte solution. However, when the crosslinked structure is excessively formed in the inorganic porous layer, the flexibility of the inorganic porous layer is easily reduced, and as a result, it is highly likely that the resin binder is dislodged from the inorganic porous layer into the electrolyte solution. In other words, by suitably forming the crosslinked structure in the organic porous layer, the swelling of the resin binder due to the electrolyte solution can be suppressed, and an appropriate flexibility of the inorganic porous layer can be ensured. Consequently, the dislodgement of the resin binder into the electrolyte solution can be prevented, and it is thus expected that the area where the inorganic porous layer is peeled from the polyolefin resin microporous membrane can be controlled to 0 to 35%. From the viewpoint of shape stability of the separator during long-term use in an electricity storage device such as a battery, the area where the inorganic porous layer is peeled from the polyolefin resin microporous membrane is preferably 0 to 30%, more preferably 0 to 15% and even more preferably 0 to 8%.

The inorganic porous layer according to Embodiment 2 is arranged on at least one of the surfaces of the polyolefin microporous membrane. Therefore, the state in which the inorganic porous layer is arranged on only one of the surfaces of the polyolefin microporous membrane and the state in which the inorganic porous layer is arranged on both surfaces of the polyolefin microporous membrane are included in the scope of Embodiment 2. When the inorganic porous layer is arranged on both surfaces of the polyolefin microporous membrane, inorganic porous layers having the same configuration may be arranged, or inorganic porous layers having configurations different from each other may be arranged.

The inorganic porous layer according to Embodiment 2 preferably comprises an inorganic particle and/or a resin binder, from the viewpoint of controlling the performance of the electricity storage device and the crosslinked structure in the inorganic porous layer.

It is preferable for the inorganic porous layer according to Embodiment 2 to have at least one selected from the group consisting of (i) covalent bonding between inorganic particles, (ii) covalent bonding between resin binders, and (iii) covalent bonding between an inorganic particle and a resin binder, and more preferable to form a crosslinked structure by any of the covalent bonding (i) to (iii) or include a crosslinked structure, from the viewpoint of controlling the performance of the electricity storage device and the crosslinked structure in the inorganic porous layer.

The above description does not mean that a crosslinked structure is always formed between inorganic particles. For example, when a crosslinked structure is formed between an inorganic particle and a resin binder, it is not necessary for a crosslinked structure to be formed between inorganic particles. Similarly, the above description does not mean that a crosslinked structure is always formed between resin binders. For example, when a crosslinked structure is formed between an inorganic particle and a resin binder, it is not necessary for a crosslinked structure to be formed between resin binders.

In other words, at least one of the above crosslinked structures may be formed in the inorganic porous layer. However, from the viewpoint of facilitating the demonstration of the effect of the present invention, it is even more preferable that crosslinked structures of all of the covalent bonding (i) to (iii) be formed.

In Embodiment 2, the covalent bonding between inorganic particles, the covalent bonding between resin binders, and the covalent bonding between an inorganic particle and a resin binder include cases in which a crosslinking agent intervenes therebetween as needed.

The polyolefin resin microporous membrane according to Embodiment 2 preferably comprises a silane graft-modified polyolefin as the polyolefin resin, and more preferably comprises a polyolefin other than the silane graft-modified polyolefin in addition to the silane graft-modified polyolefin, from the viewpoint of further improving the performance of the electricity storage device. As desired, the polyolefin resin microporous membrane may comprise an additional component other than the polyolefin resin.

It is preferable that when the separator according to Embodiment 2 is brought into contact with an electrolyte solution, a silane crosslinking reaction in the silane graft-modified polyolefin contained in the polyolefin resin microporous membrane be initiated. Since the silane graft-modified polyolefin undergoes crosslinking when the separator according to Embodiment 2 is brought into an electrolyte solution, the timing of the silane crosslinking reaction can be controlled. Thus, for example, it is possible to carry out a crosslinking reaction in the manufacturing process for an electricity storage device or by arranging the separator in the electricity storage device, without carrying out a crosslinking reaction in the manufacturing process for the separator, thereby avoiding production failure of the separator and achieving safety (for example, the safety evaluated by device destruction or heating test), improved cycle characteristic, and high output of the electricity storage device. From the viewpoint of the silane crosslinking reaction, the electrolyte solution brought into contact with the silane graft-modified polyolefin is more preferably nonaqueous, and/or more preferably contains a fluorine (F)-containing lithium salt.

In Embodiment 2, the dislodgement of resin binder from the inorganic porous layer is more easily prevented by controlling the surface roughness of the region of the polyolefin microporous membrane facing the inorganic porous layer within a predetermined range. In Embodiment 2, the crosslinked structure is preferably formed in the inorganic porous layer, whereby the desired bonding property between the inorganic porous layer and the polyolefin microporous membrane is ensured, leading to the inorganic porous layer being easily affected by the control of surface roughness of the polyolefin microporous membrane. By controlling the surface roughness of the polyolefin microporous membrane, it is easy to further suppress the swelling of the resin binder due to the electrolyte solution. As a result, it is expected that the area where the inorganic porous layer is peeled from the polyolefin microporous membrane can be controlled to 0 to 35%.

Conversely, when the crosslinked structure is not formed in the inorganic porous layer or excessively formed in the inorganic porous layer, controlling the surface roughness of the polyolefin microporous membrane has little effect on the inorganic porous layer, and the idea of controlling the surface roughness of the polyolefin microporous membrane cannot be realized.

Therefore, the surface roughness of the region facing the organic porous layer of the polyolefin microporous membrane is preferably 0.2 to 3.0 µm, from the viewpoint of facilitating the demonstration of the effect of the present invention. Specifically, the surface roughness is preferably 0.20 µm or more, more preferably 0.21 µm or more, and even more preferably 0.220 µm or more. On the other hand, the surface roughness is preferably 3.00 µm or less, more preferably 2.80 µm or less, and even more preferably 0.80 µm or less. The surface roughness is measured in accordance with the method described in the Examples, and can be controlled by changing various configurations or manufacturing conditions of the polyolefin microporous membrane.

The components shared between Embodiment 1 and Embodiment 2 and preferred components for both embodiments will be described below.

<Polyolefin Resin Microporous Membrane>

The polyolefin resin microporous membrane (hereinafter, also called "polyolefin microporous membrane") may itself be used as a conventional separator. The polyolefin microporous membrane is not limited to a single layer and may comprise a plurality of layers. Therefore, for example, a laminated body in which a polyolefin microporous membrane comprising different polyolefin resins in a plurality of layers is also included in the polyolefin microporous membrane according to Embodiment 1 or 2.

The content of the polyolefin resin in the polyolefin resin microporous membrane is preferably 75% by weight or greater, more preferably 85% by weight or greater, even more preferably 90% by weight or greater, still more preferably 95% by weight or greater, and particularly preferably 98% by weight or greater, and may be 100% by weight, with respect to the total mass of the polyolefin resin microporous membrane.

(Polyolefin Resin)

The polyolefin resin is not particularly limited. Examples therefor include an ethylene or propylene homopolymer, or a copolymer formed of at least two monomers selected from the group consisting of ethylene, propylene, 1-butene, 4-methyl-1-pentene, 1-hexene, 1-octene, and norbornene. Of these, high-density polyethylene (homopolymer) or low-density polyethylene is preferred, and high-density polyethylene (homopolymer) is more preferred, from the viewpoint of allowing heat setting (also abbreviated as "HS") to be carried out at higher temperature while avoiding obstruction of the pores. The polyolefin resin may comprise a polyolefin resin other than polyethylene, in addition to the polyethylene or in place of the polyethylene. The polyolefin resin other than polyethylene includes polypropylene and polybutene. A polyolefin may be used alone, or two or more may be used in combination.

It is preferable that the polyolefin resin microporous membrane comprise both a silane graft-modified polyolefin and an ultra-high molecular weight polyethylene (UHMWPE), from the viewpoint of resistance to oxidation-reduction deterioration and a fine and uniform porous structure. Generally, it is known that the weight-average molecular weight of an ultra-high molecular weight polyethylene (UHMWPE) is 1,000,000 or greater. More preferably, the mass ratio of the silane graft-modified polyolefin to the ultra-high molecular weight polyethylene (mass of the silane graft-modified polyolefin/mass of the ultra-high molecular weight polyethylene) in the separator is 0.05/0.95 to 0.40/0.60.

It is preferable that the polyolefin resin microporous membrane comprise a polyolefin having a weight-average molecular weight of less than 1,200,000. By using a polyolefin having a weight-average molecular weight of less than 1,200,000, shrinkage of the polymer is mitigated at an early stage in a heating test of an electricity storage device, and the safety tends to be easily maintained particularly in a heating safety test. From the same viewpoint, the weight-average molecular weight of the polyolefin is more preferably less than 1,000,000, even more preferably 100,000 or greater and 1,000,000 or less, and particularly preferably 150,000 or greater and 800,000 or less. When a polyolefin having a weight-average molecular weight of less than 1,000,000 is used, compared to when a polyolefin of 1,000,000 or greater is used, the elastic modulus in the thickness direction of the obtained microporous membrane tends to be small, and thus a microporous membrane in which the unevenness of the core is comparatively easily transferred can be obtained. The polyolefin having a weight-average molecular weight of such a range may be contained in a ratio of preferably 40% by weight or greater, and more preferably 80% by weight or greater, with respected to the total mass of the polyolefin resin present in the polyolefin microporous membrane.

(Silane Graft-Modified Polyolefin)

The silane graft-modified polyolefin is composed of a structure in which the main chain is a polyolefin and alkoxysilyl is grafted to the main chain. The alkoxide substituted with alkoxysilyl is not particularly limited. Examples therefor include a methoxide, an ethoxide, and a butoxide. In addition, the main chain and the graft are connected by covalent bonding and examples for the structure include structures of an alkyl, an ether, a glycol, and an ester. When the process for manufacturing the separator according to Embodiment 1 or 2 is considered, in the stage before a crosslinking treatment step described later, the silane graft-modified polyolefin has units comprising silanol in an amount of 10 mol % or less, preferably 5 mol % or less, and more preferably 2 mol % or less, as the modification amount with respect to all ethylene units of the main chain.

The preferred silane graft-modified polyolefin has a density of 0.90 to 0.96 g/cm$^3$ and a melt mass-flow rate (MFR) of 0.2 to 5 g/min at 190° C.

The silane graft-modified polyolefin can be obtained, for example, by grafting alkoxysilyl on the main chain of a non-silane-graft-modified polyolefin among the polyolefin resins described above. In the present specification, the polyolefin resin microporous membrane free of any silane graft-modified polyolefin has a solid content modification rate (hereinafter, referred to as "degree of gelation") of 10% or less before and after heating at 160° C. in a decalin solution. When measuring the degree of gelation, the solid content means only the resin and does not include other materials such as an inorganic substance.

The polyolefin resin microporous membrane free of any silane graft-modified polyolefin can be manufactured in a composition mixed in any ratio using any one selected from the group consisting of, for example, polyethylene (PE) (X, viscosity-average molecular weight of 100,000 to 400,000), a first ultra-high molecular weight PE (Y, viscosity-average molecular weight of 400,000 to 800,000), and a second ultra-high molecular PE (Z, viscosity-average molecular weight of 800,000 to 9,000,000), or two or three selected from the group consisting of Z, Y, and Z. A polyolefin composed of only a hydrocarbon skeleton, such as low-density polyethylene (LDPE), linear low-density polyethylene (LLDPE), polypropylene (PP), or an olefin-based thermoplastic elastomer may be added into the mixed composition.

The degree of gelation of the polyolefin resin microporous membrane having a crosslinked structure such as a silane crosslinked structure is preferably 30% or greater, and more preferably 70% or greater.

(Physical Properties of Polyolefin Resin Microporous Membrane)

The weight-average molecular weight of the entire polyolefin resin microporous membrane is preferably 100,000 or greater and 1,200,000 or less, and more preferably 150,000 or greater and 800,000 or less.

The porosity of the polyolefin resin microporous membrane is preferably 20% or greater, more preferably 30% or greater, and even more preferably 32% or greater or 35% or greater. When the porosity is 20% or greater, the ability to follow rapid movement of Li ions is further improved. The porosity is preferably 90% or less, more preferably 80% or less, and even more preferably 50% or less. When the porosity is 90% or less, the membrane strength is further improved and self-discharge tends to be further suppressed. The porosity can be measured by the method described in the Examples, and can be controlled by changing the stretching ratio of the polyolefin resin microporous membrane.

The air permeability of the polyolefin resin microporous membrane is preferably 1 sec/100 cm$^3$ or more, more preferably 50 sec/100 cm$^3$ or more, even more preferably 55 sec/100 cm$^3$ or more, and still more preferably 70 sec/100 cm$^3$ or more, 90 sec/100 cm$^3$ or more, or 110 sec/100 cm$^3$ or more. When the air permeability is 1 sec/100 cm$^3$ or more, the balance between membrane thickness, porosity, and average pore size is further improved. The air permeability is preferably 400 sec/100 cm$^3$ or less, more preferably 300 sec/100 cm$^3$ or less, and even more preferably 270 sec/100 cm$^3$ or less. When the air permeability is 400 sec/100 cm$^3$ or less, the ion permeability tends to be further improved. The air permeability can be measured by the method described in the Examples, and can be controlled by changing the stretching temperature and/or the stretching ratio of the polyolefin resin microporous membrane.

The membrane thickness of the polyolefin resin microporous membrane is preferably 1.0 µm or more, more preferably 2.0 µm or more, and even more preferably 3.0 µm or more, 4.0 µm or more, or 5.5 µm or more. When the membrane thickness is 1.0 µm or more, the membrane strength tends to be further improved. The membrane thickness is preferably 500 µm or less, more preferably 100 µm or less, and even more preferably 80 µm or less, 22 µm or less, or 19 µm or less. When the membrane thickness is 500 µm or less, the ion permeability tends to be further improved. The membrane thickness can be measured by the method described in the Examples, and can be controlled by changing the stretching ratio of the polyolefin resin microporous membrane.

When the polyolefin resin microporous membrane is used as a constituent material of a separator for LIB, the membrane thickness of the polyolefin resin microporous membrane is preferably 25 µm or less, more preferably 22 µm or less or 20 µm or less, even more preferably 18 µm or less, and particularly preferably 16 µm or less. When the membrane thickness is 25 µm or less, the permeability tends to be further improved. In this case, the lower limit of the membrane thickness is 1.0 µm or more, 3.0 µm or more, 4.0 µm or more, and 5.5 µm or more.

<Inorganic Porous Layer>

The membrane thickness of the inorganic porous layer is not particularly limited, but is preferably 0.01 µm or more, more preferably 0.05 µm or more, and even more preferably 1.0 µm or more. The membrane thickness is preferably 15 µm or less, more preferably 10 µm or less, and even more preferably 5 µm or less. It is preferable to set the membrane thickness to 0.01 µm or more from the viewpoint of improving mechanical strength. It is preferable to set the membrane thickness to 15 µm or less, since the volume occupied by the separator in an electricity storage device is reduced, which tends to be advantageous from the viewpoint of increasing the capacity of the electricity storage device. It is also preferable that the membrane thickness of the inorganic porous layer be 15 µm or less, from the viewpoint of preventing an excessive increase in air permeability of the separator. The membrane thickness can be measured in accordance with the method described in the Examples, and can be controlled by changing the coating amount of a slurry for forming the inorganic porous layer (slurry for inorganic porous layer) onto the polyolefin resin microporous membrane.

The air permeability of the inorganic porous layer may be a value that does not excessively increase the air permeability of the separator. The air permeability of the inorganic porous layer corresponds to the increase in the air permeability of the separator by the inorganic porous layer formed on the polyolefin resin microporous separator. The increase is preferably 200 sec/100 cm$^3$ or less, more preferably 150 sec/100 cm$^3$ or less, and even more preferably 130 sec/100 cm$^3$ or less. It is preferable that the increase be 200 sec/100 cm$^3$ or less from the viewpoint of allowing ions in a nonaqueous electrolyte solution (hereinafter, also simply referred to as "electrolyte solution") to suitably permeate during charging and discharging of an electricity storage device. The increase can be measured in accordance with the method described in the Examples, and can be controlled by changing various configurations and manufacturing conditions of the inorganic porous layer.

<Crosslinked Structure>

In the inorganic porous layer, it is preferable that the crosslinked structure be formed by at least one selected from the group consisting of a nucleophilic substitution reaction, a nucleophilic addition reaction, an electrophilic addition reaction, and a silane coupling reaction. When such a crosslinked structure is present in the inorganic porous layer, the effect of the present invention is easily demonstrated. From the same viewpoint, when the inorganic porous layer comprises a crosslinking agent, it is preferable that in the inorganic porous layer, a polar functional group be present on the surface of an inorganic particle, a crosslinking agent be present between the polar functional group and a resin binder, and a crosslinked structure is formed by covalent bonding between a polar functional group, a crosslinking agent, and a resin binder.

The crosslinked structure may be formed (i) during or immediately after the membrane production process or (ii) by using a chemical substance in the surrounding environment or inside the electricity storage device, after the separator is housed in the electricity storage device. Depending on the degree of progress of the above crosslinking reaction (i) during or immediately after the membrane production process of the inorganic porous layer, the environment in the electricity storage device housing the inorganic porous layer, the configuration of the microporous membrane laminated on the inorganic porous layer, and the crosslinking timing when the microporous membrane has crosslinkability, it is possible for the crosslinking reaction in the inorganic porous layer to further proceed after the separator comprising the inorganic porous layer is housed in the electricity storage device. Therefore, it is preferable that the inorganic porous layer be configured so as to facilitate the above crosslinking reactions (i) and/or (ii).

A layer (additional layer) corresponding to neither the inorganic porous layer nor the polyolefin resin microporous membrane may be interposed therebetween. However, it is preferable that such an additional layer be not interposed therebetween. Specifically, it is preferable that the inorganic porous layer be arranged directly above the polyolefin resin microporous membrane. According to this, the configuration or characteristics of the inorganic porous layer can be easily controlled by the configuration of the polyolefin resin microporous membrane (for example, surface roughness of a region facing the inorganic porous layer of the polyolefin resin microporous membrane).

The crosslinked structure (crosslinking reaction) by covalent bonding is preferably at least one selected from the group consisting of, for example, the following reactions (I) and (II):

(I) a reaction between a plurality of different functional groups, and (II) a chain condensation reaction of a functional group and a crosslinking agent.

The combination of functional groups or reactants forming a crosslinked structure by covalent bonding based on the reaction (I) is not particularly limited, but is preferably, for example, a hydroxyl group and a carboxyl group (esterification);
a carbonyl group and an alkyl group (aldol condensation);
a halogen and a carboxyl group (intramolecular condensation);
an alkoxy group and an alkyl group (Claisen condensation);
a carbonyl group and an acid anhydride (Perkin reaction);
an amine group and a halogen;
an isocyanate group and a hydroxy group (formation of urethane bond); or
an oxazoline group and a hydroxy group.

The combination of functional groups forming a crosslinked structure by covalent bonding based on the reaction (II) is not particularly limited, but is preferably, for example, a reaction between inorganic particle(s) and/or resin binder(s) with a crosslinking agent (including a ring-opening reaction). When inorganic particle(s) and/or resin binder(s) are crosslinked via a crosslinking agent, it is preferable that such a crosslinking agent have at least two active groups. The plurality of active groups may be of any structure or group, may be substituted or unsubstituted, may comprise a heteroatom or an inorganic, and may be the same or different from each other as long as the active groups can cause a crosslinking reaction between inorganic particle(s) and/or resin binder(s).

(Inorganic Particle)

The inorganic particle according to the present embodiment forms a crosslinked structure by covalent bonding with another inorganic particle and/or by covalent bonding with a resin binder. The material that can be used as such an inorganic particle is not particularly limited. Examples therefor include inorganic oxides (oxide-based ceramics) such as alumina, silica, titania, zirconia, magnesia, ceria, yttria, zinc oxide, and iron oxide; inorganic nitrides (nitride-based ceramics) such as silicon nitride, titanium nitride, and boron nitride; ceramics such as silicon carbide, calcium carbonate, magnesium sulfate, aluminum sulfate, aluminum hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomite, and quartz; and glass fiber. An inorganic particle may be used alone, or two or more may be used in combination.

The mass ratio of the inorganic particles in the inorganic porous layer (100×mass of inorganic particles/mass of inorganic porous layer) is preferably 30% by weight or greater, and more preferably 50% by weight or greater, from the viewpoint of ensuring heat resistance. The mass ratio is preferably 99.5% by weight or less, more preferably 99.0% by weight or less, and even more preferably 98% by weight or less, from the viewpoint of ensuring space for containing the binder in the inorganic porous layer.

The form of the inorganic particles may be tabular, scaly, needle-like, columnar, spherical, polyhedral, or aggregated (block-shaped). Inorganic particles with these shapes may also be combined for use.

The number-average particle size of the inorganic particle is, for example, 0.01 μm or more, 0.1 μm or more, or 0.3 μm or more. In addition, the number-average particle size is 10.0 μm or less, 9.0 μm or less, or 6.0 μm or less. Examples for the method of adjusting the particle size include methods of grinding the inorganic particles to reduce the particle size using an appropriate grinder, such as a ball mill, a bead mill, and a jet mill.

It is preferable that a polar functional group is present on the surface of the inorganic particle. Specifically, it is preferable that the inorganic particle has a polar functional group on the surface thereof. Accordingly, reactivity with other compounds (a resin binder, an inorganic particle, or an optionally contained crosslinking agent) can be enhanced. Thus, a suitable crosslinked structure is easily formed by covalent bonding between an inorganic particle and a resin binder, or by covalent bonding between a plurality of inorganic particles when a plurality of inorganic particles are present. From the same viewpoint, the polar functional group is preferably at least one selected from the group consisting of a carboxyl group, a hydroxyl group, and an amine group.

It is preferable that a silicon-containing functional group is present on the surface of the inorganic particle. Specifically, it is also preferable that the inorganic particle has a silicon-containing functional group on the surface thereof. Accordingly, reactivity with other compounds (a resin binder, an inorganic particle, or an optionally contained crosslinking agent) can be enhanced. Thus, a suitable crosslinked structure is easily formed by covalent bonding between an inorganic particle and a resin binder, or by covalent bonding between a plurality of inorganic particles when a plurality of inorganic particles are present. From the same viewpoint, the silicon-containing functional group is preferably at least one selected from the group consisting of an alkoxysilyl group, a halogen-substituted silyl group, and a silazane group.

(Resin Binder)

The resin binder forms a crosslinked structure by covalent bonding with another resin binder, and/or by covalent bonding with an inorganic particle. The material that can be used as such a resin binder is not particularly limited, but is, for example, a resin that is insoluble in an electrolyte solution of an electricity storage device typified by LIB and is electrochemically stable in the scope of use of the electricity storage device, and may be used alone or in combination of two or more.

Specific examples for the material that can be used as the resin binder include polyolefins such as polyethylene and polypropylene; fluorine-containing resins such as polyvinylidene fluoride (PVdF) and polytetrafluoroethylene; fluorine-containing rubbers such as vinylidene fluoride-hexafluoropropylene-tetrafluoroethylene copolymer and ethylene-tetrafluoroethylene copolymer; rubbers such as styrene-butadiene copolymer and hydrides thereof, acrylonitrile-butadiene copolymer and hydrides thereof, acrylonitrile-butadiene-styrene copolymer and hydrides thereof, methacrylic acid ester-acrylic acid ester copolymer, styrene-acrylic acid ester copolymer, acrylonitrile-acrylic acid ester copolymer, ethylene propylene rubber, polyvinyl alcohol, and polyvinyl acetate; cellulose derivatives such as ethyl cellulose, methyl cellulose, hydroxyethyl cellulose, and carboxymethyl cellulose; and resins having a melting point and/or glass transition temperature of 180° C. or higher, such as polyphenylene ethers, polysulfones, polyethersulfones, polyphenylene sulfides, polyetherimides, polyamideimides, polyamides, and polyesters. A resin binder may be used alone, or two or more may be used in combination.

Examples for the resin binder include the following 1) to 7):

1) polyolefins: for example, polyethylene, polypropylene, ethylene-propylene rubber, and modified forms thereof;
2) conjugated diene-based polymers: for example, styrene-butadiene copolymers and the hydrogenated forms thereof, acrylonitrile-butadiene copolymers and the hydrogenated forms thereof, and acrylonitrile-butadiene-styrene copolymers and the hydrogenated forms thereof;
3) acrylic-based polymers: for example, methacrylic acid ester-acrylic acid ester copolymers, styrene-acrylic acid ester copolymers, and acrylonitrile-acrylic acid ester copolymers;
4) polyvinyl alcohol-based resins: for example, polyvinyl alcohol and polyvinyl acetate;
5) fluorine-containing resins: for example, PVdF, polytetrafluoroethylene, vinylidene fluoride-hexafluoropropylene-tetrafluoroethylene copolymer, and ethylene-tetrafluoroethylene copolymer;
6) cellulose derivatives: for example, ethyl cellulose, methyl cellulose, hydroxyethyl cellulose, and carboxymethyl cellulose; and
7) polymers that are resins with a melting point and/or glass transition temperature of 180° C. or higher, or without a melting point but having a decomposition temperature of 200° C. or higher: for example, polyphenylene ethers, polysulfones, polyethersulfones, polyphenylene sulfides, polyetherimides, polyamideimides, polyamides, and polyesters.

These types of resin binders can be obtained by known production methods such as emulsion polymerization or solution polymerization, using any desired monomers as the starting materials. The polymerization is not restricted in terms of the polymerization temperature, the pressure during polymerization, the method of adding the monomers and the additives used (polymerization initiator, molecular weight modifier, pH regulator, etc.).

It is preferable that the above resin binder and/or the crosslinking agent described later be in the form of an emulsion, a suspension, or a colloid. Of these, the emulsion, which is formed of a core portion composed of a predetermined particle and a shell portion containing a predetermined polymer compound surrounding the core portion, is preferred from the viewpoint of membrane formability and mechanical strength of the obtained inorganic porous layer. The particle forming the core portion may be an organic polymer compound or an inorganic microparticle. From the viewpoint of imparting flexibility to the ultimately obtained inorganic porous layer, the organic polymer compound is more preferred. A suspension refers to, for example, a substance which has solid particles that can be seen with a microscope dispersed in a solvent. A colloid refers to a substance in which macromolecules that can be visually confirmed are dispersed.

It is preferable that the resin binder have a functional group that causes nucleophilic substitution reaction (nucleophilic substitution-reactive functional group) or a functional group that causes nucleophilic addition reaction (nucleophilic addition-reactive functional group) between polar functional groups and/or silicon-containing functional groups present on the surface of the above inorganic particle.

Accordingly, reactivity with other compounds (for example, an inorganic particle, a resin binder, or an optionally contained crosslinking agent) can be enhanced. Thus, a suitable crosslinked structure is easily formed by covalent bonding between an inorganic particle and a resin binder, or by covalent bonding between a plurality of resin binders when a plurality of resin binders are present. From the same viewpoint, the nucleophilic substitution-reactive functional group or the nucleophilic addition-reactive functional group of the resin binder is preferably at least one selected from the group consisting of a carboxyl group, a hydroxy group, and an amine group.

The mass ratio of the resin binder in the inorganic porous layer (100×mass of resin binder/mass of inorganic porous layer) is preferably 0.5% by weight or greater, and more preferably 1.0% by weight or greater, from the viewpoint of ensuring heat resistance. The mass ratio is preferably 50% by weight or less, and more preferably 20% by weight or less, from the viewpoint of ensuring space for containing the inorganic particle in the inorganic porous layer.

(Crosslinking Agent)

The inorganic porous layer preferably comprises a crosslinking agent in addition to the above inorganic particle and the above resin binder. Accordingly, a suitable crosslinked structure is more easily formed in the inorganic porous layer. The mass ratio of the crosslinking agent in the inorganic porous layer (100×mass of crosslinking agent/mass of inorganic porous layer) is appropriately selected from the range of, for example, 0.01% by weight to 5% by weight. The mass ratio of the crosslinking agent in the inorganic porous layer is more preferably 0.1% by weight to 5% by weight, and even more preferably 0.1% by weight to 3% by weight.

The crosslinking agent preferably contains the above inorganic particle and/or an active group that is reactive with the above resin binder. It is preferable that, for example, the crosslinking agent have a functional group that causes a nucleophilic substitution reaction (nucleophilic substitution-reactive functional group) and/or a functional group that causes an electrophilic addition reaction (electrophilic addition-reactive functional group) between the above inorganic particle(s) and/or resin binder(s). Particularly, it is preferable that the crosslinking agent have a nucleophilic substitution-reactive functional group and an electrophilic addition-reactive functional group. Accordingly, a suitable crosslinked structure is more easily formed in the inorganic porous layer. Thereamong, the nucleophilic substitution-reactive functional group of the crosslinking agent is preferably an oxazoline group and/or an epoxy group. Also thereamong, the electrophilic addition-reactive functional group of the crosslinking agent is preferably at least one selected from the group consisting of an isocyanate group, a thioisocyanate group, a carbodiimide group, an allene group, an oxime group, and a carbonyl group.

Examples for the crosslinking agent that can be used include oxazoline-based crosslinking agents such as the Epocros series (K-2010E, K-2020E, K-2030, WS-300, WS-500, WS-700) manufactured by Nippon Shokubai Co., Ltd.; carbodiimide-based crosslinking agents such as the Carbodilite series (V-02, V-02-L2, SV-02, V-04, V-10, SW-12G, E-02, E-03A) manufactured by Nisshinbo Chemical Inc.; isocyanate-based crosslinking agents such as the Duranate series (WB40-100, WB40-80D, WT20-100, WT30-100, WL70-100, WR80-70P, WE50-100) manufactured by Asahi Kasei Corp.; epoxy-based crosslinking agents such as the Denacol series (such as EX-61B, EX-313, and FCA-678) manufactured by Nagase ChemteX Corp.; alkoxysilanes such as triethoxysilane (X-12-1273ES) manufactured by Shin-Etsu Chemical Co., Ltd., dimethyldimethoxysilane, methyltrimethoxysilane, and tetraethoxysilane; and crosslinking agents for alkoxysilane compounds containing various functional groups (KBM series (such as 3-aminopropyltrimethoxysilane KBM-903), KBE series) manufactured by Shin-Etsu Chemical Co., Ltd.

The crosslinking agent may also be an agent used, for example, as a silane coupling agent. The silane coupling agent is an organosilicon compound comprising a hydrolyzable active group, and is an active group capable of bonding to an inorganic particle comprising silica after hydrolysis.

<Other Additives>

The polyolefin resin microporous membrane and/or the inorganic porous layer may comprise optional additives. The additives are not particularly limited. Examples therefor include phenol-based, phosphorus-based, and sulfur-based oxidation inhibitors; metal soaps such as calcium stearate and zinc stearate; ultraviolet absorbers; photostabilizers; antistatic agents; antifogging agents; and color pigments.

<Method for Manufacturing Separator>

(Method for Manufacturing Polyolefin Resin Microporous Membrane)

As the method for manufacturing the polyolefin resin microporous membrane, a known manufacturing method can be adopted, for example, either a wet porosification method or a dry porosification method may be adopted. Examples for the wet porosification method include a porosification method of melt-kneading a polyolefin resin composition and a plasticizer, molding into a sheet, stretching the sheet in some cases, and then extracting the plasticizer; a porosification method of melt-kneading a polyolefin resin composition containing a polyolefin-based resin as a main component, extruding at a high draw ratio, and then peeling off the polyolefin crystal interface by heat treatment and stretching; a porosification method of melt-kneading a polyolefin resin composition and an inorganic filler, molding into a sheet, and then peeling off the interface between the polyolefin and the inorganic filler by stretching; and a porosification method of dissolving a polyolefin resin composition and then immersing in a poor solvent of the polyolefin to solidify the polyolefin while removing the solvent.

Hereinafter, as an example of a method for manufacturing the polyolefin microporous membrane, a method of melt-kneading a polyolefin resin composition and a plasticizer, molding into a sheet, and then extracting the plasticizer will be described. First, a polyolefin resin composition and a plasticizer are melt-kneaded. Examples for the melt-kneading method include a method in which a polyolefin resin and, as needed, other additives are charged into a resin kneading apparatus such as an extruder, a kneader, a Labo-Plastomill, a kneading roll, or a Banbury mixer to heat-melt the resin component while introducing a plasticizer at any ratio. At this time, it is preferable that the polyolefin resin, other additives, and the plasticizer be pre-kneaded at a predetermined ratio using, for example, a Henschel mixer before charging into a resin kneading apparatus. More preferably, only a portion of the plasticizer is added in the pre-kneading, and the remaining plasticizer is kneaded while side-feeding to the resin kneading apparatus.

As the plasticizer, a non-volatile solvent capable of forming a uniform solution at the melting point of the polyolefin or higher can be used. Specific examples for the non-volatile solvent include hydrocarbons such as liquid paraffin and paraffin wax; esters such as dioctyl butyrate and dibutyl butyrate; and higher alcohols such as oleyl alcohol and stearyl alcohol. Of these, liquid paraffin is preferred.

The ratio of the polyolefin resin composition to the plasticizer may be in a range in which these can be uniformly melt-kneaded and molded into a sheet. For example, the mass fraction of the plasticizer in a composition composed of the polyolefin resin composition and the plasticizer is preferably 30% by weight or greater and 80% by weight or less, and more preferably 40% by weight or greater and 70% by weight or less. It is preferable to set the mass fraction in these ranges from the viewpoint of achieving both melt tension during melt-molding and formability of a uniform and fine pore structure.

The melt-kneaded product obtained by heat-melting and kneading as described above is molded into a sheet. Examples for the method of manufacturing a sheet-like molded body include a method of extruding the melt-kneaded product into a sheet form via a T-die, bringing the sheet into contact with a heat conductor, and cooling to a temperature sufficiently lower than the crystallization temperature of the resin component to solidify the sheet. Examples for the heat conductor used for cooling solidification include metal, water, air, and the plasticizer itself. However, a metal roll is preferred for heat conduction efficiency. In this case, it is more preferable if the melt-kneaded product is pinched between the metal rolls when brought into contact with the rolls, since the heat conduction efficiency is further increased, the sheet is oriented to increase membrane strength, and the surface smoothness of the sheet is also improved. The die lip gap when extruding into a sheet via a T-die is preferably 400 μm or more and 3000 μm or less, and more preferably 500 μm or more and 2500 μm or less.

It is preferable that the sheet-like molded body be stretched next. As the stretching treatment, either uniaxial stretching or biaxial stretching can be suitably used. Biaxial stretching is preferred from the viewpoint of the strength of the obtained microporous membrane. When the sheet-like molded body is stretched biaxially at a high ratio, the molecules are oriented in the plane direction, and the ultimately obtained polyolefin microporous membrane is difficult to tear and has a high puncture strength. Examples for the stretching method include methods such as simultaneous biaxial stretching, sequential biaxial stretching, multistage stretching, and multi-pass stretching. From the viewpoint of improvement in puncture strength, uniformity in stretching, and shutdown property, simultaneous biaxial stretching is preferred.

The stretching ratio is preferably in the range of 20 or greater and 100 or less in terms of area ratio, and more preferably in the range of 25 or greater and 50 or less. The stretching ratio in each axial direction is preferably in the ranges of 4 or greater and 10 or less in the MD and 4 or greater and 10 or less in the TD, and more preferably in the ranges of 5 or greater and 8 or less in the MD and 5 or greater and 8 or less in the TD. It is preferable to set the stretching ratios to the ratios in these ranges in that more sufficient strength can be imparted, membrane rupture in the stretching step can be prevented, and high productivity can be obtained.

Note that MD means the machine direction when, for example, the polyolefin microporous membrane is continuously molded, and TD means the transverse direction at an angle of 90° from the MD.

The sheet-like molded body obtained as described above may be further rolled. Rolling can be carried out by, for example, a pressing method using a double belt press machine. Particularly, rolling can increase the orientation of the surface layer portion of the sheet-like molded body. The rolling area ratio is preferably greater than 1 and 3 or less, and more preferably greater than 1 and 2 or less. It is preferable to set the rolling ratio in these ranges, in that the membrane strength of the ultimately obtained polyolefin microporous membrane is increased, and a uniform porous structure can be formed from the membrane thickness direction.

The plasticizer is then removed from the sheet-like molded body to obtain a polyolefin microporous membrane. Examples for the method of removing the plasticizer include a method of immersing the sheet-like molded body in an extraction solvent to extract the plasticizer and drying sufficiently. The method of extracting the plasticizer may be either a batch method or a continuous method. In order to suppress shrinkage of the polyolefin microporous membrane, it is preferable that the end portions of the sheet-like molded body be restrained during a series of immersing and drying steps. In addition, the residual amount of plasticizer in the microporous polyolefin membrane is preferably less than 1% by weight.

As the extraction solvent, it is preferable to use one that is a poor solvent of the polyolefin resin, is a good solvent of the plasticizer, and has a boiling point lower than the melting point of the polyolefin resin. Examples for such an extraction solvent include hydrocarbons such as n-hexane and cyclohexane; halogenated hydrocarbons such as methylene chloride and 1,1,1-trichloroethane; non-chlorine-based halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be recovered by an operation such as distillation and reused.

In order to suppress the shrinkage of the polyolefin microporous membrane, a heat treatment such as heat setting or heat relaxation may be carried out after the stretching step or the formation of the polyolefin microporous membrane. The polyolefin microporous membrane may undergo a post-treatment such as a hydrophilization treatment with a surfactant or a crosslinking treatment with ionizing radiation.

(Method for Manufacturing Polyolefin Resin Microporous Membrane Comprising Silane Graft-Modified Polyolefin)

A method for manufacturing a polyolefin resin microporous membrane comprising a silane graft-modified polyolefin will be described below in the case of a microporous membrane (flat membrane), without intending to exclude forms other than a flat membrane. The method for manufacturing the microporous membrane comprising a silane graft-modified polyolefin comprises the following steps:

(1) a sheet molding step;
(2) a stretching step;
(3) a porous body forming step; and
(4) a heat treatment step.

The method for manufacturing the microporous membrane comprising a silane graft-modified polyolefin may comprise a kneading step before the sheet molding step (1) and/or a winding/slitting step after the heat treatment step (3) as desired. From the viewpoint of maintaining silane crosslinkability until contact with an electrolyte solution, it is preferable that a silane crosslinking treatment step be not included. The silane crosslinking treatment step is generally a step in which the object to be treated comprising a silane graft-modified polyolefin is brought into contact with a mixture of an organometallic catalyst and water or immersed in a base solution or an acid solution, and undergoes a silane dehydration-condensation reaction to form an oligosiloxane bond.

The metal of the organometallic catalyst may be at least one selected from the group consisting of, for example, scandium, titanium, vanadium, copper, zinc, aluminum, zirconium, palladium, gallium, tin, and lead. Examples for the organometallic catalyst include di-butyltin-di-laurate, di-butyltin-di-acetate, and di-butyltin-di-octoate, which are known to overwhelmingly accelerate the reaction rate by the reaction mechanism proposed by Weji et al. (F. W. van der Weji: Macromol. Chem., 181, 2541, 1980.). However, in recent years, in order to avoid damage to the environment and human health by organic tin, it is known that the Lewis functions of chelate complexes of copper or titanium can be used and combined with organic bases to promote reaction-forming siloxane bonds between alkoxysilyl group, similar to organic tin complexes.

The base solution may have a pH of higher than 7 and may include, for example, alkali metal hydroxides, alkaline earth metal hydroxides, alkali metal carbonates, alkali metal phosphates, ammonia, or amine compounds. Of these, alkali metal hydroxides and alkaline earth metal hydroxides are preferred, alkali metal hydroxides are more preferred and sodium hydroxide is even more preferred, from the viewpoint of the electricity storage device and silane crosslinkability.

The acid solution has a pH of below 7 and may include, for example, inorganic acids or organic acids. Preferred acids are hydrochloric acid, sulfuric acid, carboxylic acids, or phosphoric acids.

In the kneading step, a silane graft-modified polyolefin can be kneaded with a plasticizer or an inorganic material and other polyolefins, as desired, using a kneading machine. From the viewpoint of suppressing generation of resin aggregates in the production process and maintaining silane crosslinkability until contact with an electrolyte solution, it is preferable that a masterbatch resin containing the dehydration-condensation catalyst be not added to the kneaded product.

The plasticizer is not particularly limited, and examples therefor include organic compounds that can form homogeneous solutions with polyolefins at temperatures below the boiling points thereof. More specifically, these include decalin, xylene, dioctyl phthalate, dibutyl phthalate, stearyl alcohol, oleyl alcohol, decyl alcohol, nonyl alcohol, diphenyl ether, n-decane, n-dodecane, and paraffin oil. Paraffin oil and dioctyl phthalate are preferred thereamong. A plasticizer may be used alone, or two or more may be used in combination. The ratio of the plasticizer is not particularly limited. However, the ratio of the polyolefin and the silane graft-modified polyolefin is preferably 20% by weight or greater with respect to the total mass of the microporous membrane, as needed, from the viewpoint of porosity of the obtained microporous membrane, and is preferably 90% by weight or less from the viewpoint of viscosity during melt-kneading.

The sheet molding step is a step in which the obtained kneaded product or a mixture of a silane graft-modified polyolefin, an ultra-high molecular weight polyolefin, and a plasticizer is extruded, cooled, solidified, and molded into sheet form to obtain a sheet. The sheet molding method is not particularly limited. Examples therefor include a method of melt-kneading and extruding a melt and then solidifying the melt by compression cooling. Examples for the cooling method include a method of bringing the melt into direct contact with a cooling medium such as cool air and cooling water and a method of bringing the melt in contact with a roll cooled by a refrigerant or a press machine. Of these, the method of bringing the melt in contact with a roll cooled by a refrigerant or a press machine is preferred in that the membrane thickness controllability is excellent.

From the viewpoint of the resin aggregates in the microporous membrane and the internal maximum heat generation rate, the mass ratio of the silane graft-modified polyolefin to the ultra-high molecular weight polyethylene (mass of silane graft-modified polyolefin/mass of ultra-high molecular weight polyethylene) in the sheet forming step is preferably 0.05/0.95 to 0.4/0.6, and more preferably 0.06/0.94 to 0.38/0.62.

From the viewpoint of suppressing thermal runaway at the destruction of the electricity storage device and improving safety while having a low-temperature shutdown property of 150° C. or lower and a membrane rupture resistance at a high temperature of 180° C. or higher for the separator, it is preferable that in the sheet molding step, the silane graft-modified polyolefin be not a masterbatch resin containing the dehydration-condensation catalyst which crosslinks the silane graft-modified polyolefin from before the sheet molding step. The membrane rupture resistance can be ensured preferably at 190° C. or higher, 200° C. or higher, 210° C. or higher, 220° C. or higher, 230° C. or higher, 240° C. or higher, or 250° C. or higher. The upper limit of the membrane rupture temperature of the separator is not limited, but it is understood in the present technical field that the membrane rupture phenomenon can occur at a temperature higher than 250° C.

The stretching step is a step in which a plasticizer or an inorganic material is extracted from the obtained sheet as needed and the sheet is further stretched in one or more axial direction. Examples for the method of stretching the sheet include MD uniaxial stretching by a roll stretching machine, TD uniaxial stretching by a tenter, sequential biaxial stretching by a roll stretching machine and a tenter or a combination of tenters, and simultaneous biaxial stretching by a simultaneous biaxial tenter or inflation molding. From the viewpoint of obtaining a more uniform membrane, simultaneous biaxial stretching is preferred. The total area ratio is preferably 8 or greater, more preferably 15 or greater, and even more preferably 20 or greater or 30 or greater, from the viewpoint of uniformity of membrane thickness and a balance between tensile elongation, porosity, and average pore size. By setting the total area ratio to 8 or greater, a membrane having high strength and satisfactory thickness distribution tends to be easily obtained. Further, the area ratio may be 250 or less from the viewpoint of preventing rupture.

The porous body forming step is a step in which a plasticizer is extracted from the stretched product after the stretching step and the stretched product is porosified. The method of extracting the plasticizer is not particularly limited. Examples therefor include a method of immersing the stretched product in an extraction solvent and a method of showering the stretched product with an extraction solvent. The extraction solvent is not particularly limited, but is preferably a poor solvent of the polyolefin, is a good solvent of the plasticizer or the inorganic material, and has a boiling point lower than the melting point of the polyolefin. Such an extraction solvent is not particularly limited. Examples therefor include hydrocarbons such as n-hexane and cyclohexane; halogenated hydrocarbons such as methylene chloride, 1,1,1-trichloroethane, and fluorocarbons; alcohols such as ethanol and isopropanol; ketones such as acetone and 2-butanone; and alkaline water. An extraction solvent may be used alone, or two or more may be used in combination.

The heat treatment step is a step in which a plasticizer is extracted from the sheet as needed after the stretching step and a heat treatment is further carried out to obtain a microporous membrane. The heat treatment method is not particularly limited. Examples therefor include a heat setting method in which stretching and relaxation operations are carried out using a tenter or a roll stretching machine. The relaxation operation refers to a reduction operation carried out at a predetermined temperature and relaxation rate in the machine direction (MD) and/or the width direction (TD) of the membrane. The relaxation rate is a value obtained by dividing the MD dimension of the membrane after the relaxation operation by the MD dimension of the membrane before the operation or a value obtained by dividing the TD dimension of the membrane after the relaxation operation by the TD dimension of the membrane before the operation, or when both MD and TD undergo relaxation, a value obtained by multiplying the MD relaxation rate by the TD relaxation rate. Further, in the winding step, the obtained microporous membrane can be slit as needed and wound around a predetermined core.

(Method for Manufacturing Inorganic Porous Layer)

The method for manufacturing the inorganic porous layer is not particularly limited, and a known method can be adopted. Examples therefor, regardless of whether the polyolefin resin microporous membrane comprises a silane graft-modified polyolefin resin, include a method of applying a coating solution containing inorganic particles and a resin binder (slurry for inorganic porous layer) onto the polyolefin resin microporous film. The slurry for the inorganic porous layer may contain a crosslinking agent as desired. A starting material comprising inorganic particles and a resin binder and a starting material of the polyolefin resin microporous membrane comprising a polyolefin resin may be laminated and extruded by a coextrusion method, or the polyolefin resin microporous membrane and the inorganic porous layer (membrane) may be fabricated individually and then laminated together.

The solvent of the coating solution is preferably a solvent capable of uniformly and stably dispersing or dissolving the inorganic particles and the resin binder. Examples therefor include N-methylpyrrolidone (NMP), N,N-dimethylformamide, N,N-dimethylacetamide, water, ethanol, toluene, hot xylene, methylene chloride, and hexane.

The above crosslinking agent may be added to the coating solution. In addition, a dispersant such as a surfactant; a thickener; a wetting agent; an antifoaming agent; and a pH adjuster containing an acid or an alkali may be added to the coating solution.

Examples for the method of dispersing or dissolving the inorganic particles and the resin binder in the solvent of the coating solution include mechanical stirring with a ball mill, a bead mill, a planetary ball mill, a vibrating ball mill, a sand mill, a colloidal mill, an attritor, a roll mill, high-speed impeller dispersion, a disperser, a homogenizer, a high-speed impact mill, ultrasonic dispersion, and stirring blades.

Examples for the method of applying the coating solution onto the polyolefin resin microporous membrane include gravure coater method, small-diameter gravure coater method, reverse roll coater method, transfer coater method, kiss coater method, dip coater method, knife coater method, air doctor coater method, blade coater method, rod coater method, squeeze coater method, cast coater method, die coater method, screen printing method, and spray coating method.

The method for removing the solvent from the coated membrane after coating is not particularly limited as long as the polyolefin resin microporous membrane is not adversely affected. Examples therefor include a method of setting a polyolefin resin microporous membrane while drying at the melting point of the material constituting the polyolefin resin microporous membrane or lower, a method of drying under reduced pressure at low temperature, and a method of extracting the solvent simultaneously with solidifying the resin binder by immersing in a poor solvent of the resin binder. A portion of the solvent may remain as long as the device characteristics are not significantly affected.

<Electricity Storage Device>

The separator according to Embodiments 1 and 2 can be used in an electricity storage device. The electricity storage device comprises a positive electrode, a negative electrode, a separator according to Embodiment 1 or 2 arranged between the positive and negative electrodes, and an electrolyte solution. Specific examples for the electricity storage device include a lithium battery, a lithium secondary battery, a lithium-ion secondary battery (LIB), a sodium secondary battery, a sodium-ion secondary battery, a magnesium secondary battery, a magnesium-ion secondary battery, a calcium secondary battery, a calcium-ion secondary battery, an aluminum secondary battery, an aluminum-ion secondary battery, a nickel-hydrogen battery, a nickel-cadmium battery, an electric double layer capacitor, a lithium-ion capacitor, a redox flow battery, a lithium-sulfur battery, a lithium-air battery, and a zinc-air battery. Of these, a lithium battery, a lithium secondary battery, an LIB, a nickel-hydrogen battery, or a lithium-ion capacitor is preferred, and a lithium battery or an LIB is more preferred, from the viewpoint of practicality.

The electrolyte solution in the battery may contain moisture, and the moisture contained in the system after the battery is manufactured may be moisture contained in the electrolyte solution or moisture brought in by members such as the electrodes or the separator. The electrolyte solution may contain a nonaqueous solvent. Examples for the solvent contained in the nonaqueous solution of the present embodiment include alcohols such as methanol and ethanol; and aprotic solvents. Of these, aprotic solvents are preferred as the nonaqueous solvent.

Examples for the aprotic solvent include a cyclic carbonate, a fluoroethylene carbonate, a lactone, an organic compound having a sulfur atom, a chain fluorinated carbonate, a cyclic ether, a mononitrile, an alkoxy group-substituted nitrile, a dinitrile, a cyclic nitrile, a short chain fatty acid ester, a chain ether, a fluorinated ether, a ketone, and a compound in which a portion or all of the H atoms of the aprotic solvent are substituted with halogen atoms.

Examples for the cyclic carbonate include ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethylvinylene carbonate, and vinyl ethylene carbonate.

Examples for the fluoroethylene carbonate include 4-fluoro-1,3,dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one, and 4,4,5-trifluoro-5-methyl-1,3-dioxolan-2-one.

Examples for the lactone include γ-butyrolactone, α-methyl-γ-butyrolactone, γ-valerolactone, γ-caprolactone, δ-valerolactone, δ-caprolactone, and ε-caprolactone.

Examples for the organic compound having a sulfur atom include ethylene sulfite, propylene sulfite, butylene sulfite, pentene sulfite, sulfolane, 3-sulfolane, 3-methyl sulfolane, 1,3-propane sultone, 1,4-butane sultone, 1-propene 1,3-sultone, dimethyl sulfoxide, tetramethylene sulfoxide, and ethylene glycol sulfite.

Examples for the chain carbonate include ethyl methyl carbonate, dimethyl carbonate, diethyl carbonate, methyl propyl carbonate, methyl isopropyl carbonate, dipropyl carbonate, methyl butyl carbonate, dibutyl carbonate, and ethyl propyl carbonate.

Examples for the cyclic ether include tetrahydrofuran, 2-methyl tetrahydrofuran, 1,4-dioxane, and 1,3-dioxane.

Examples for the mononitrile include acetonitrile, propionitrile, butyronitrile, valeronitrile, benzonitrile, and acrylonitrile.

Examples for the alkoxy group-substituted nitrile include methoxyacetonitrile and 3-methoxypropionitrile.

Examples for the dinitrile include malononitrile, succinonitrile, methylsuccinonitrile, glutaronitrile, 2-methylglutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, 2,4-dimethylglutaronitrile, and ethylene glycol bis(propionitrile) ether.

Examples for the cyclic nitrile include benzonitrile.

Examples for the short chain fatty acid ester include methyl acetate, methyl propionate, methyl isobutyrate, methyl butyrate, methyl isovalerate, methyl valerate, methyl pivalate, methyl hydroangelate, methyl caproate, ethyl acetate, ethyl propionate, ethyl isobutyrate, ethyl butyrate, ethyl isovalerate, ethyl valerate, ethyl pivalate, ethyl hydroangelate, ethyl caproate, propyl acetate, propyl propionate, propyl isobutyrate, propyl butyrate, propyl isovalerate, propyl valerate, propyl pivalate, propyl hydroangelate, propyl caproate, isopropyl acetate, isopropyl propionate, isopropyl isobutyrate, isopropyl butyrate, isopropyl isovalerate, isopropyl valerate, isopropyl pivalate, isopropyl hydroangelate, isopropyl caproate, butyl acetate, butyl propionate, butyl isobutyrate, butyl butyrate, butyl isovalerate, butyl valerate, butyl pivalate, butyl hydroangelate, butyl caproate, isobutyl acetate, isobutyl propionate, isobutyl isobutyrate, isobutyl butyrate, isobutyl isovalerate, isobutyl valerate, isobutyl pivalate, isobutyl hydroangelate, isobutyl caproate, tert-butyl acetate, tert-butyl propionate, tert-butyl isobutyrate, tert-butyl butyrate, tert-butyl isovalerate, tert-butyl valerate, tert-butyl pivalate, tert-butyl hydroangelate, and tert-butyl caproate.

Examples for the chain ether include dimethoxyethane, diethyl ether, 1,3-dioxolane, diglyme, triglyme, and tetraglyme.

Examples for the fluorinated ether include a compound represented by general formula $Rf_{aa}$-$OR_{bb}$, wherein $Rf_{aa}$ is an alkyl group containing a fluorine atom, and $R_{bb}$ is an organic group which may contain a fluorine atom.

Examples for the ketone include acetone, methyl ethyl ketone, and methyl isobutyl ketone.

Examples for the compound in which a portion or all of the H atoms of the aprotic solvent are substituted with halogen atoms include a compound in which the halogen atoms are fluorine.

Examples for fluorides of the chain carbonate include methyl trifluoroethyl carbonate, trifluorodimethyl carbonate, trifluorodiethyl carbonate, trifluoroethylmethyl carbonate, methyl 2,2-difluoroethyl carbonate, methyl 2,2,2-trifluoroethyl carbonate, and methyl 2,2,3,3-tetrafluoropropyl carbonate. The above fluorinated chain carbonate can be represented by the following general formula:

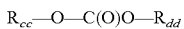

wherein $R_{cc}$ and $R_{dd}$ are at least one selected from the group consisting of $CH_3$, $CH_2CH_3$, $CH_2CH_2CH_3$, $CH(CH_3)_2$, and $CH_2Rf_{ee}$ (wherein $Rf_{ee}$ is an alkyl group having 1 to 3 carbon atoms in which at least one hydrogen atom is substituted with a fluorine atom), and $R_{cc}$ and/or $R_{dd}$ contain at least one fluorine atom.

Examples for fluorides of the short chain fatty acid ester include fluorinated short chain fatty acid esters typified by 2,2-difluoroethyl acetate, 2,2,2-trifluoroethyl acetate, and 2,2,3,3-tetrafluoropropyl acetate. The fluorinated short chain fatty acid ester can be represented by the following general formula:

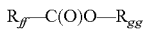

wherein $R_{ff}$ is at least one selected from the group consisting of $CH_3$, $CH_2CH_3$, $CH_2CH_2CH_3$, $CH(CH_3)_2$, $CF_3CF_2H$, $CFH_2$, $CF_2H$, $CF_2Rf_{hh}$, $CFHRf_{hh}$, and $CH_2Rf_{ii}$; $R_{gg}$ is at least one selected from the group consisting of $CH_3$, $CH_2CH_3$, $CH_2CH_2CH_3$, $CH(CH_3)_2$, and $CH_2Rf_{ii}$; $Rf_{hh}$ is an alkyl group having 1 to 3 carbon atoms in which at least one hydrogen atom may be substituted with a fluorine atom; $Rf_{ii}$ is an alkyl group having 1 to 3 carbon atoms in which at least one hydrogen atom may be substituted with a fluorine atom; and $R_{ff}$ and/or $R_{gg}$ contain at least one fluorine atom, and when $R_{ff}$ is $CF_2H$, $R_{gg}$ is not $CH_3$.

The LIB as a typical example of an electricity storage device uses a lithium transition metal oxide such as lithium cobalt oxide or a lithium cobalt composite oxide as a positive electrode, a carbon material such as graphite as a negative electrode, and a nonaqueous organic solvent containing a fluorine-containing lithium salt such as $LiPF_6$ as an electrolyte solution. During charging/discharging of the LIB, ionized Li (lithium) reciprocates between the electrodes. Since it is necessary for the ionized Li to move between the electrodes at comparatively high speeds while suppressing the contact between the electrodes, a separator is arranged between the electrodes.

<Method for Manufacturing Electricity Storage Device>

The method for manufacturing the electricity storage device using the separator is not particularly limited, and may be exemplified, for example, by the following method. First, a vertically elongated separator having a width of 10 to 500 nm (preferably 80 to 500 mm) and a length of 200 to 4000 m (preferably 1000 to 4000 m) is manufactured. Next, lamination is carried out in the order of positive electrode-separator-negative electrode-separator or negative electrode-separator-positive electrode-separator and the laminated body is wound in a circular or flat spiral shape to obtain a wound body. The wound body can be housed in a device can (for example, a battery can) and an electrolyte solution is further injected therein to manufacture an electricity storage device. Alternatively, the electricity storage device may also be manufactured by a method in which the electrodes and the separator are folded up instead of forming into a wound body and placed into a device container (for example, an aluminum film), and then an electrolyte solution is injected therein.

The wound body may also be pressed during this time. Specifically, the separator may be stacked and pressed with an electrode having a current collector and an active material layer formed on at least one side of the current collector.

The pressing temperature is preferably 20° C. or higher, as an example of a temperature allowing adhesion to be effectively demonstrated. From the viewpoint of inhibiting blocking or heat shrinkage of the pores in the separator by hot pressing, the pressing temperature is preferably lower than the melting point of the material in the microporous membrane, and more preferably 120° C. or lower. The pressing pressure is preferably 20 MPa or lower from the viewpoint of inhibiting blocking of the pores of the separator. The pressing time may be 1 sec or less when a roll press is used, or several hours for surface pressing, but from the viewpoint of productivity, it is preferably 2 h or less. Using the separator for electricity storage device from Embodiment 1 or 2, by the above production process, it is possible to reduce press back during press molding of a wound body comprising the electrodes and the separator. It is thus possible to inhibit yield reduction in the device assembly steps and shorten the production process time.

Since the electricity storage device manufactured as described above, particularly the LIB, comprises the separator according to Embodiment 1 or 2, the performance thereof (for example, the cycle characteristic and the safety evaluated by device destruction or heating test) can be further improved.

In the manufactured electricity storage device, it is preferable that a step of connecting lead terminals to at least one pair of the electrodes of the electricity storage device and to a power supply and a step of charging and discharging for at least one cycle be carried out, from the viewpoint of ensuring the silane crosslinking reaction of the polyolefin resin microporous membrane comprising the silane graft-modified polyolefin. A substance that exerts catalytic action on the silane crosslinking reaction is generated in the electrolyte solution or on the surface of the electrodes by the charging and discharging cycle, whereby the silane crosslinking reaction is achieved.

Without wishing to be bound by theory, it is assumed that a methoxysilane graft portion is converted to silanol by a trace amount of moisture (moisture contained in members such as the electrodes, separator, and electrolyte solution) contained in the electricity storage device, undergoes a crosslinking reaction, and is changed to a siloxane bond. Further, when the electrolyte or the electrolyte solution is brought into contact with an electrode, it is considered that a substance that exerts a catalytic action on the silane crosslinking reaction is generated in the electrolyte solution or the electrode surface and dissolved in the electrolyte solution, and the amorphous portion in the polyolefin having the silane-modified graft uniformly swells and diffuses, whereby the crosslinking reaction of the separator-containing laminated body or wound body is uniformly promoted. The substance that exerts a catalytic action on the silane crosslinking reaction may be in the form of an acid solution or a membrane, and when the electrolyte contains lithium hexafluorophosphate ($LiPF_6$), can be obtained from hydrogen fluoride (HF) generated from a reaction of $LiPF_6$ with moisture or a fluorine-containing organic substance derived from hydrogen fluoride (HF).

When the separator for an electricity storage device according to Embodiment 1 or 2 is incorporated into the electricity storage device, the silane graft-modified polyolefin in the polyolefin resin microporous membrane is crosslinked, and/or a crosslinked structure is formed by covalent bonding between a plurality of components in the inorganic porous layer, whereby the electricity storage device is considered to have improved cycle characteristic and safety while adapting to the manufacturing process of a conventional electricity storage device.

EXAMPLES

The present invention will now be explained in greater detail by the Examples and Comparative Examples, with the understanding that the invention is not limited to the Examples so long as the gist thereof is maintained. The physical properties in the Examples were measured by the following methods.

(Method for Detecting Silane-Modified Polyolefin in Separator)

Since the silane-modified polyolefin contained in the separator in a crosslinked state is insoluble or has insufficient solubility in an organic solvent, it is difficult to directly measure the content of the silane-modified polyolefin from the separator. In this case, as a pretreatment of the sample, the silane-modified polyolefin contained in the separator may be detected by decomposing the siloxane bond into methoxysilanol using methyl orthoformate, which does not cause a side reaction, and then measuring by solution NMR. The pretreatment experiment may be carried out with reference to Japanese Patent Publication No. 3529854 and Japanese Patent Publication No. 3529858.

Specifically, $^1$H- or $^{13}$C-NMR identification of the silane-modified polyolefin as the starting material used for production of the separator may be employed in the detection method for the silane-modified polyolefin in the separator. The following are examples for $^1$H- and $^{13}$C-NMR measurement methods.

($^1$H-NMR Measurement)

The sample is dissolved in o-dichlorobenzene-d4 at 140° C. and a $^1$H-NMR spectrum is obtained at a proton resonance frequency of 600 MHz. The $^1$H-NMR measuring conditions are as follows.

Apparatus: AVANCE NEO 600 by Bruker
Sample tube diameter: 5 mmφ
Solvent: o-dichlorobenzene-d4
Measuring temperature: 130° C.
Pulse angle: 30°
Pulse delay time: 1 sec
Number of scans: 1000 or greater
Sample concentration: 1 wt/vol %

($^{13}$C-NMR Measurement)

The sample is dissolved in o-dichlorobenzene-d4 at 140° C. and a $^{13}$C-NMR spectrum is obtained. The $^{13}$C-NMR measuring conditions are as follows.

Apparatus: AVANCE NEO 600 by Bruker
Sample tube diameter: 5 mmφ
Solvent: o-dichlorobenzene-d4
Measuring temperature: 130° C.
Pulse angle: 30°
Pulse delay time: 5 sec
Number of scans: 10,000 or greater
Sample concentration: 10 wt/vol %

$^1$H- and/or $^{13}$C-NMR measurement allows the amount of silane unit modification and the amount of polyolefin alkyl group modification in the silane-modified polyolefin to be confirmed for a polyolefin starting material, and allows the silane-modified polyolefin contained in the separator to be determined (—$CH_2$—Si: $^1$H, 0.69 ppm, t; $^{13}$C, 6.11 ppm, s).

(1) Weight-Average Molecular Weight

Standard polystyrene was measured using a Model ALC/GPC 150C™ by Waters Co. under the following conditions, and a calibration curve was drawn. The chromatogram for each polymer was also measured under the same conditions, and the weight-average molecular weight of each polymer was calculated by the following method, based on the calibration curve.

Column: GMH₆-HT™ (2)+GMH₆-HTL™ (2) by Tosoh Corp.
Mobile phase: o-dichlorobenzene
Detector: differential refractometer
Flow rate: 1.0 ml/min
Column temperature: 140° C.
Sample concentration: 0.1 wt %

(Weight-Average Molecular Weight of Polyethylene)

Each molecular weight component in the obtained calibration curve was multiplied by 0.43 (polyethylene Q factor/polystyrene Q factor=17.7/41.3), to obtain a molecular weight distribution curve in terms of polyethylene, and the weight-average molecular weight was calculated.

(Weight-Average Molecular Weight of Resin Composition)

The weight-average molecular weight was calculated in the same manner as for polyethylene, except that the Q factor value for the polyolefin with the largest weight fraction was used.

(2) Viscosity-Average Molecular Weight (Mv)

The limiting viscosity [η] (dl/g) at 135° C. in a decalin solvent was determined based on ASTM-D4020. The Mv of polyethylene was calculated by the following formula.

$$[\eta]=6.77\times10^{-4} Mv^{0.67}$$

(3) Melt Mass-Flow Rate (MFR) (g/10 min)

A melt mass-flow rate measuring device by Toyo Seiki Co., Ltd. (Melt Indexer F-F01) was used to determine the weight of the resin extruded for 10 min under conditions of 190° C. and 2.16 kg of pressure as the MFR value.

(4) Thicknesses of Microporous Membrane and Inorganic Porous Layer (μm)

A micro-thickness gauge, KBM™, by Toyo Seiki Co., Ltd. was used to measure the membrane thickness of the microporous membrane at room temperature of 23±2° C. and relative humidity of 60%. Specifically, the membrane thickness was measured at 5 points at substantially equal intervals over the entire width in the TD, and the average value thereof was obtained.

The membrane thickness of the separator was measured according to the same method. The membrane thickness of the microporous membrane was then subtracted from the membrane thickness of the separator, and the obtained value was used as the membrane thickness of the inorganic porous layer.

(5) Porosity of Microporous Membrane (%)

A 10 cm×10 cm square sample was cut from the microporous membrane. The volume (cm³) and mass (g) thereof were determined, and the porosity was calculated from these values and the density (g/cm³) using the following equation. The density and mixing ratio of each starting material were used to determine the density of the mixed composition. For example, in the case of a polyolefin microporous membrane composed of polyethylene, 0.95 (g/cm³) can be assumed to calculate the density of the mixed composition.

Porosity (%)=(volume−mass/density of mixed composition)/volume×100

(6) Air Permeability of Microporous Membrane and Increase in Air Permeability (sec/100 cm³)

A Gurley type air permeability meter, G-B2™, Toyo Seiki Co., Ltd. was used to measure the air permeability of the microporous membrane in accordance with JIS P-8117 (2009).

The air permeability of the separator was measured according to the same method. The air permeability of the separator was subtracted from the air permeability of the microporous membrane, and the obtained value was used as the increase in air permeability.

(7) Surface Roughness of Microporous Membrane (μm)

The surface roughness (μm) of the microporous membrane was calculated with a VK-X200 by KEYENCE Corp. under the conditions of the measurement mode of surface shape, measurement pitch of 0.2 μm, surface roughness calculation area of 216 μm×287 μm (observation magnification of 50 times), in accordance with JIS B0671-2002.

(8) Safety Test 1 Against Destruction of Battery (Battery Destruction Test 1)

The safety test is a test in which an iron nail is driven into a battery charged to 4.5 V at a speed of 20 mm/sec and penetrates the battery to cause an internal short circuit. This test can measure the time-dependent change behavior of voltage reduction of the battery and the battery surface temperature increase behavior due to an internal short circuit to elucidate these phenomena during an internal short circuit. Rapid heat generation of the battery may be caused by an insufficient shutdown function or membrane rupture at low temperature during an internal short circuit. Consequently, the electrolyte solution may ignite, and the battery may emit smoke and/or explode.

(Fabrication of Battery Used in Safety Test)

a. Fabrication of Positive Electrode

A slurry was prepared by dispersing 92.2% by weight of a lithium cobalt composite oxide $LiCoO_2$ as a positive electrode active material, 2.3% by weight each of flaky graphite and acetylene black as conductive materials, and 3.2% by weight of PVdF as a resin binder in NMP. The slurry was coated using a die coater onto one side of a 20 μm-thick aluminum foil as the positive electrode collector, and then dried at 130° C. for 3 min, followed by compression molding using a roll press. During this time, the active material coating amount on the positive electrode was adjusted to 250 g/m² and the active material bulk density was adjusted to 3.00 g/cm³.

b. Fabrication of Negative Electrode

A slurry was prepared by dispersing 96.9% by weight of artificial graphite as a negative electrode active material, 1.4% by weight of carboxymethyl cellulose ammonium salt as a resin binder, and 1.7% by weight of styrene-butadiene copolymer latex in purified water. The slurry was coated using a die coater onto one side of a 12 μm-thick copper foil as the negative electrode collector and dried at 120° C. for 3 min, followed by compression molding using a roll press. During this time, the active material coating amount on the negative electrode was adjusted to 106 g/m² and the active material bulk density was adjusted to 1.35 g/cm³.

c. Preparation of Nonaqueous Electrolyte Solution $LiPF_6$ was dissolved as a solute at a concentration of 1.0 mol/L in a mixed solvent of ethylene carbonate:ethylmethyl carbonate=1:2 (volume ratio) to prepare a nonaqueous electrolyte solution.

d. Battery Assembly

A separator was cut out to 60 mm in the width (TD) direction and 1000 mm in the length (MD) direction, the separator was folded in a hairpin fashion, and positive electrodes and negative electrodes were alternately stacked between the separator (12 positive electrodes and 13 negative electrodes). The positive electrodes used had areas of 30 mm×50 mm, and the negative electrodes had areas of 32 mm×52 mm. The laminated stack that had been folded in a hairpin fashion was inserted into a laminating bag, and then injected with the nonaqueous electrolyte solution obtained in c. above and sealed. After allowing to stand at room temperature for 1 day, the fabricated battery was subjected to initial charging for a total of 6 h by a method of charging to a battery voltage of 4.2 V at a current value of 3 mA (0.5 C) in an atmosphere of 25° C. and, after reaching that voltage, beginning to draw out a current of 3 mA while maintaining 4.2 V. Subsequently, the battery was discharged to a battery voltage of 3.0 V at a current value of 3 mA (0.5 C).

(Maximum Heat Generation Rate)

After an iron nail was driven into the obtained battery at a speed of 20 mm/sec and penetrated, a thermocouple was used to measure the battery surface temperature over a period of 300 sec. From the temperature change graph, the rate when the temperature change per sec was the largest was defined as the maximum heat generation rate.

(Voltage Drop Time)

After the iron was driven into the obtained battery at a speed of 20 mm/sec and penetrated, the time required for the voltage to drop from 4.5 V to 3 V was defined as the voltage drop time (time for drop to 3V).

(9) Evaluation of Cycle Characteristic 1 (Battery Cycle Stability 1) and Method of Fabricating Battery Therefor Following the same method as in a. to c. of the method of fabricating the battery used in the above section "(8) Battery destruction test 1" but with the assembly described in d. below, a battery for evaluating cycle characteristic was fabricated.

The obtained battery was charged and discharged for 100 cycles in an atmosphere of 60° C. The battery was subjected to charging for a total of 3 h by a method of charging to a battery voltage of 4.2 V at a current value of 6.0 mA (1.0 C) and, after reaching that voltage, beginning to draw out a current of 6.0 mA while maintaining 4.2 V. The battery was then discharged to a battery voltage of 3.0 V at a current value of 6.0 mA (1.0 C). The capacity retention rate (%) was calculated from the discharge capacity at the $100^{th}$ cycle and the first cycle. When the capacity retention rate in the battery cycle stability was high, the battery was evaluated as having satisfactory cycle characteristic.

d. Battery Assembly

A separator cut to a circle having a diameter of 18 mm and a positive electrode and a negative electrode cut to circles having a diameter of 16 mm were stacked in the order of positive electrode, separator, and negative electrode, so that the active surfaces of the positive electrode and the negative electrode faced each other, and housed in a stainless-steel metal container with a lid. With the container and the lid insulated, the container was in contact with the copper foil of the negative electrode and the lid was in contact with the aluminum foil of the positive electrode. The container was injected thereinto with the nonaqueous electrolyte solution obtained in c. of the above section "(8) Battery destruction test 1" and then sealed. After allowing to stand at room temperature for 1 day, the fabricated battery was subjected to initial charging for a total of 6 h by a method of charging to a battery voltage of 4.2 V at a current value of 3 mA (0.5 C) in an atmosphere of 25° C. and after reach that voltage, beginning to draw out a current of 3 mA while maintaining 4.2 V. Subsequently, the battery was discharged to a battery voltage of 3.0 V at a current value of 3 mA (0.5 C).

(10) Measurement 1 of Shutdown and Membrane Rupture Temperatures (Fuse/Meltdown (F/MD) Characteristic 1)

A positive electrode, a separator, and a negative electrode were cut into circular shapes having a diameter of 200 mm, stacked to obtain a laminated body, and soaked entirely in an electrolyte solution added thereto. The laminated body was interposed in the center of a circular aluminum heater having a diameter of 600 mm, and the aluminum heater was pressed at 0.5 MPa from above and below with hydraulic jacks to complete the preparation for measurement. The resistance (Ω) between the electrodes was measured while heating the laminated body with the aluminum heater at a heating rate of 2° C./min. The temperature at which the resistance between the electrodes of the fuse of the separator increased and exceeded 1000Ω for the first time was defined the fuse temperature (shutdown temperature). Heating was further continued, and the temperature at which the resistance decreased to 1000Ω or less was defined as the meltdown temperature (membrane rupture temperature). Regarding the measurement, a wire for resistance measurement was attached with a conductive silver paste to the back of the aluminum foil of the positive electrode fabricated in the section "a. Fabrication of positive electrode" of the above "(8) Battery destruction test". Further, regarding the measurement, a wire for resistance measurement was attached with a conductive silver paste to the back of the copper foil of the negative electrode fabricated in the section "b. Fabrication of negative electrode" of the above "(8) Battery destruction test". Furthermore, regarding the measurement, the electrolyte solution prepared in the section "c. Preparation of nonaqueous electrolyte solution" of the above "(8) Battery destruction test" was used for the F/MD characteristic test.

(11) Solvent Immersion Test

The microporous membrane on which the inorganic porous layer was formed was cut into a 5.0×5.0 cm square, immersed in 25° C. acetone in a glass sample can, and subjected to vibration with the glass sample can at a frequency of 40 Hz for 10 min using an ultrasonic cleaning machine.

Figure 3:
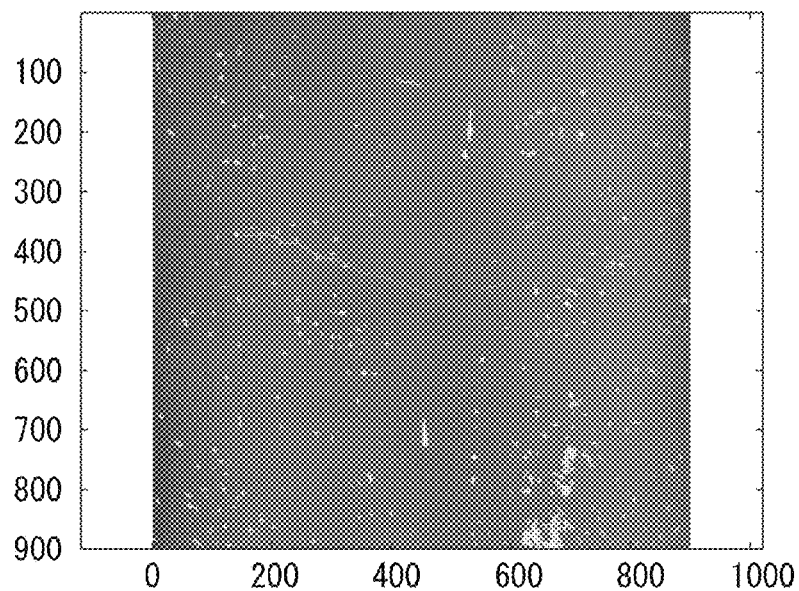
FIG. 3 is a drawing showing an example of a monochrome image, according to one embodiment of the present invention.

The microporous membrane on which the inorganic porous layer was formed was then removed from the acetone and air-dried. The surface side on which the inorganic porous layer was formed was captured as a monochrome image under the conditions of a shading gradation of 8 bits and a resolution of 600 dpi using a scanner manufactured by Epson Corp. (refer to FIG. 3).

The captured image was subjected to image processing according to the following methods (I) to (IV), and the ratio of the area of peeled portion (peeled area (%)) was derived.

(I) The captured image was designated as the evaluation image P, and the length of one side of the evaluation image P was defined as each of X and Y. Each of X and Y may correspond to the length of one side of the cut microporous membrane. Thus, X=5 cm and Y=5 cm.

(II) In the evaluation image P, when the direction along the X side is the X axis and the direction along the Y side is the Y axis, the shading value of the pixels at the coordinate positions (x, y) constituting the evaluation image P is P(x, y). A histogram was then prepared for all the shading values P(x, y) of Xp×Yp included in the evaluation image P.

An example of a histogram obtained from the evaluation for Example 15 is shown in FIG. 1. In FIG. 1, the vertical axis (in logarithmic scale) indicates the frequency value and the horizontal axis indicates the shading value. From FIG. 1, each of a peak indicating a bright portion (the peak on the side where the shading value is small) and a peak indicating a dark portion (the peak on the side where the shading value is large) was confirmed. The shading value corresponding to the apex of a peak indicating a bright portion was determined as the bright portion shading value Pb, and the shading value corresponding to the apex of the peak indicating a dark portion was determined as the dark portion shading value Pd. In FIG. 1, frequency values for giving the bright portion shading value Pb and the dark portion shading value Pd are each represented by an "×" mark.

When the pixel number of either one of the pixel number corresponding to bright portions and the pixel number corresponding to dark portions is comparatively small, the peak having the smaller pixel number may not be clearly confirmed. Even in this case, it is possible to determine the bright portion shading value Pb and the dark portion shading value Pd according to the shape of the obtained histogram, as follows.

(II-1)

Figure 2:
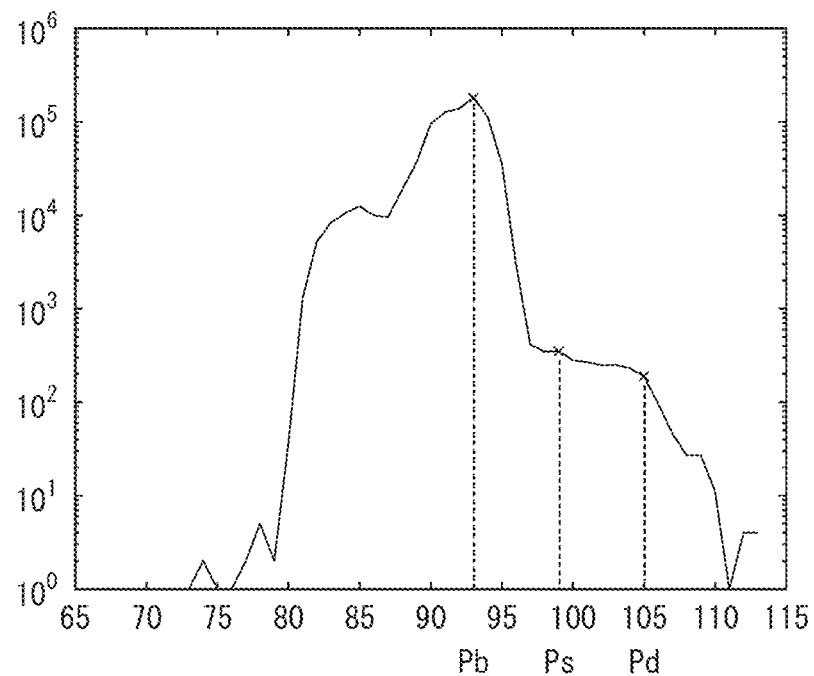
FIG. 2 is a drawing showing another example of a histogram used to derive the percentage (%) of peeled area, according to one embodiment of the present invention.

Another example of a histogram is shown in FIG. 2. The vertical axis and the horizontal axis are the same as in the example of FIG. 1. When the pixel number corresponding to dark portions is comparatively small, as shown in FIG. 2, a peak indicating a bright portion may be confirmed, but a peak indicating a dark portion may not be clearly confirmed. In this case, the shading value of the portion (the portion corresponding to the right shoulder of the histogram) where the frequency value begins to sharply decrease after remaining substantially constant on the histogram as the shading value increases in the range where the shading value is larger than a peak corresponding to brightness can be determined as the dark portion shading value Pd. In FIG. 2, the frequency values for giving the bright portion shading value Pb and the dark portion shading value Pd are each represented by an "×" mark.

(II-2)

When the pixel number corresponding to bright portions is comparatively small, although not shown, a peak indicating a dark portion may be confirmed, but a peak indicating a bright portion may not be clearly confirmed. In this case, the shading value of the portion (the portion corresponding to the left shoulder of the histogram) where the frequency value begins to sharply decrease after remaining substantially constant on the histogram as the shading value decreases in the range where the shading value is smaller than a peak corresponding to dark portion can be determined as the bright portion shading value Pd.

(III) The bright portion shading value Pb and the dark portion shading value Pd determined as described above were used to calculate an average value thereof according to the following formula, and the obtained value was used to determine a threshold value Ps. In FIGS. 1 and 2, the frequency values for giving the threshold value Ps are each represented by an "×" mark.

Threshold value $Ps$=(bright portion shading value $Pb$+dark portion shading value $Pd$)/2

Figure 4:
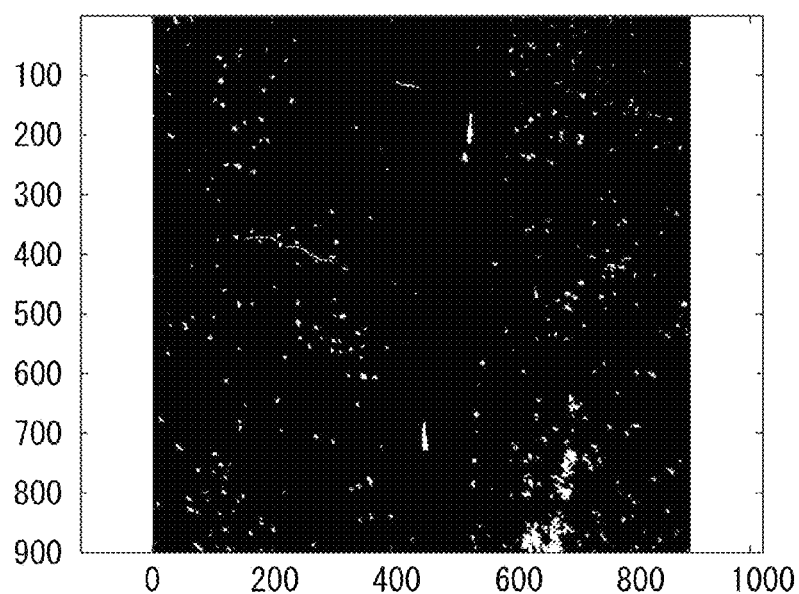
FIG. 4 is a drawing showing an example of a binarized image, according to one embodiment of the present invention.

(IV) An array BW(x, y) was prepared as a binarized image having the same size as the evaluation image P. In the evaluation image P, for a pixel P(x, y) having a shading value larger than the threshold shading value Ps, 1 was assigned to BW(x, y) corresponding to that pixel P(x, y) and processed as a bright portion. For a pixel P(x, y) having a shading value equal to or smaller than the threshold value Ps, 0 was assigned to the BW(x, y) corresponding to that pixel P(x, y) and was processed as a dark portion. Accordingly, a binarized image BW in which bright portions and dark portions in the evaluation image P are distinguished was obtained (refer to FIG. 4).

(V) Of the binarized images BW, the number of BW(x, y) having a value of 1 was determined as the bright portion pixel number Br. Similarly, of the binarized images BW, the number of BW(x, y) having a value of 0 was determined as the dark portion pixel number Dk. The formula Br+Dk=Xp×Yp holds between Br, Dk, Xp, and Yp.

(VI) The bright portion ratio Brp was obtained by the formula Brp=Br/(Xp×Yp), and the dark portion ratio Dkp was obtained by the formula Dkp=Dk/(Xp×Yp). The obtained bright portion ratio was used to determine the ratio (%) of the area of the peeled portion, and the obtained dark portion ratio Dkp was used to determine the ratio (%) of the area of the normal portion.

[Manufacturing Example of Silane Graft-Modified Polyolefin]

To a polyethylene having a viscosity-average molecular weight of 20,000 as a polyethylene starting material, an organic peroxide (di-t-butyl peroxide) was added while the polyethylene starting material was melt-kneaded with an extruder to generate radicals in the α-olefin polymer chain. A trimethoxyalkoxide-substituted vinylsilane was then injected, and an alkoxysilyl group was introduced into the α-olefin polymer by an addition reaction to form a silane graft structure. In order to adjust the radical concentration in the reaction system simultaneously, an appropriate amount of an antioxidant (pentaerythritol tetrakis[3-(3,5-di-t-butyl-4-hydroxyphenyl)propionate]) was added, and the chain reaction (gelation) in the α-olefin was suppressed. The obtained silane graft polyolefin melt resin was cooled in water, pelleted, and then dried by heating at 80° C. for 2 days to remove any moisture or unreacted trimethoxyalkoxide-substituted vinylsilane. The residual concentration in the pellets of the unreacted trimethoxyalkoxide-substituted vinylsilane was about 1500 ppm or less.

By the modification reaction using trimethoxyalkoxide-substituted vinylsilane as described above, a silane graft polyethylene (indicated as "silane-modified polyethylene (B)" in Tables 1, 2, 5, and 6) having an MFR (190° C.) of 0.24 g/min was obtained.

Example 1

(Manufacturing of Silane-Crosslinkable Polyolefin Microporous Membrane)

A mixture was obtained by combining 19.8% by weight of the silane-modified polyethylene (B) obtained above with 79.2% by weight of a polyethylene homopolymer (indicated as "polyethylene (A)" in Tables 1, 2, 5, and 6) having a weight-average molecular weight of 700,000 to form a resin formulation comprising a resin composition of polyethylenes (A) and (B) at 0.8 and 0.2, respectively, adding to the formulation 1% by weight of pentaerythrityl-tetrakis-[3-(3, 5-di-t-butyl-4-hydroxyphenyl)propionate] as an antioxidant, and dry-blending using a tumbler blender. The obtained mixture was then fed into a twin-screw extruder by a feeder in a nitrogen atmosphere. Liquid paraffin (kinematic viscosity of $7.59 \times 10^{-5}$ m$^2$/s at 37.78° C.) was injected into the extruder cylinder by a plunger pump.

The mixture and the liquid paraffin were melt-kneaded in the extruder, and the feeder and the pump were adjusted so that the ratio of liquid paraffin in the extruded polyolefin composition was 70% by weight (i.e., the polymer concentration is 30% by weight). The melt-kneading conditions were a set temperature of 220° C., a screw rotational speed of 240 rpm, and a discharge rate of 18 kg/h.

Subsequently, the melt-kneaded product was extruded via a T-die and cast on a cooling roll controlled to a surface temperature of 25° C. to obtain a gel sheet (sheet-like molded body) having an original membrane thickness of 1100 μm.

The sheet-like molded body was then introduced to a simultaneous biaxial tenter stretching machine and biaxially stretched to obtain a stretched product. The set stretching conditions were a MD ratio of 7.0, a TD ratio of 6.2, and a biaxial stretching temperature of 120° C.

The stretched gel sheet was then introduced into a tank of dichloromethane and sufficiently immersed in the dichloromethane to extract away the liquid paraffin. Thereafter, the dichloromethane was dried away to obtain a porous body.

The porous body was then introduced to a TD tenter for heat setting (HS), which was carried out at a heat setting temperature of 133° C. and a stretching ratio of 2.1. Thereafter, a relaxation operation was carried out to a ratio of 2.0 in the TD.

The obtained microporous membrane was then cut at the ends and wound as a mother roll having a width of 1,100 mm and a length of 5,000 m.

For the above evaluation, the microporous membrane unwound from the mother roll was slit as needed and used as an evaluation microporous membrane.

The membrane thickness, air permeability, porosity, and surface roughness of the obtained evaluation microporous membrane were measured and shown in Table 1.
(Manufacturing of Inorganic Porous Layer)
(Method for Producing Acrylic Latex)

The acrylic latex to be used as the resin binder is produced by the following method.

70.4 parts by weight of ion-exchanged water and 0.5 parts by weight of "AQUALON KH1025" (registered trademark of Daiichi Kogyo Seiyaku Co., Ltd., 25% aqueous solution) and 0.5 parts by weight of "ADEKA REASOAP SR1025" (registered trademark of Adeka Corp., 25% aqueous solution) as emulsifiers were charged into a reactor equipped with a stirrer, a reflux condenser, a drip tank, and a thermometer. The internal temperature of the reactor was then raised to 80° C., and 7.5 parts by weight of a 2% aqueous solution of ammonium persulfate was added while maintaining the temperature at 80° C. to obtain an initial mixture. 5 min after the addition of the ammonium persulfate aqueous solution was completed, an emulsified liquid was added dropwise from the drip tank into the reactor over a period of 150 min.

The above emulsified liquid was prepared by forming a mixture of 70 parts by weight of butyl acrylate; 29 parts by weight of methyl methacrylate; 1 part by weight of methacrylic acid; 3 parts by weight of "AQUALON KH1025" (registered trademark of Daiichi Kogyo Seiyaku Co., Ltd., 25% aqueous solution) and 3 parts by weight of "ADEKA REASOAP SR1025" (registered trademark of Adeka Corp., 25% aqueous solution) as emulsifiers; 7.5 parts by weight of a 2% aqueous solution of ammonium persulfate; and 52 parts by weight of ion-exchanged water, and mixing with a homomixer for 5 min.

Upon completion of the dropwise addition of the emulsified liquid, the internal temperature of the reactor was maintained at 80° C. for 90 min, and thereafter cooled to room temperature. The obtained emulsion was adjusted to a pH of 8.0 with a 25% aqueous solution of ammonium hydroxide, and then a small amount of water was added to obtain an acrylic latex with a solid content of 40%. The obtained acrylic latex had a number-average particle size of 145 nm and a glass transition temperature of −23° C.
(Formation of Inorganic Porous Layer)

A dispersion was prepared by uniformly dispersing 94.6 parts by weight of aluminum hydroxide oxide (average particle size of 1.4 μm) as inorganic particles and 0.4 parts by weight (in terms of solid content) of an ammonium polycarboxylate aqueous solution (SN-DISPERSANT 5468, solid content concentration of 40%, manufactured by San Nopco Ltd.) as an ionic dispersant in 100 parts by weight of water. The obtained dispersion was crushed by a bead mill (cell volume of 200 cc, zirconia bead size of 0.1 mm, filling amount of 80%), and the particle size distribution of the inorganic particles was adjusted to D50=1.0 μm. 2.0 parts by weight (in terms of solid content) of acrylic latex (solid content concentration of 40%, average particle size of 145 nm, glass transition temperature of −23° C., constituent monomer: butyl acrylate) as a resin binder was added to the dispersion with the adjusted particle size distribution, followed by adding 3.0 parts by weight (in terms of solid content) of EPOCROS K-2010E manufactured by Nippon Shokubai Co., Ltd. as a crosslinking agent to produce an inorganic particle-containing slurry.

A microporous membrane was then continuously drawn out from the above microporous membrane mother roll. The microporous membrane was coated on one side with the inorganic particle-containing slurry by a gravure reverse coater, dried in a dryer at 60° C. to remove the water, and wound to obtain a separator mother roll.

During evaluation, the separator unwound from the mother roll was slit as needed and used as an evaluation separator.

Examples 2 to 14 and Comparative Examples 1 to 18

Except that the presence of the silane-modified polyethylene (B), various starting material compositions, HS ratios, and stretching temperatures were adjusted as indicated in Table 1 or 2, separators having various physical properties were fabricated according to the same method as in Example 1. Note that, the crosslinking agent of Examples 2, 3, and 11 to 14 and Comparative Examples 1 to 3 was EPOCROS K-2010E manufactured by Nippon Shokubai Co., Ltd., the crosslinking agent of Example 4 was Carbodilite V-02 manufactured by Nisshinbo Chemical Inc., the crosslinking agent of Example 5 was Duranate WB40-100 manufactured by Asahi Kasei Corp., and Denacol EX-61B manufactured by Nagase ChemteX Corp. was used in Example 6 as an epoxy-based crosslinking agent. Tetraethoxysilane manufactured by Shin-Etsu Chemical Co., Ltd. was used in Examples 7, 9, and 10. 3-Aminopropyltrimethoxysilane KBM-903 manufactured by Shin-Etsu Chemical Co., Ltd. was used in Example 8. A hardener 12A manufactured by Asahi Kasei Corp. was used in Comparative Examples 9 and 14. Ethylenediaminetetraacetic acid (EDTA) manufactured by Sigma-Aldrich was used in Comparative Examples 10, 12, 15, and 17. 1,4,7,10-Tetraazacylododecane-1,4,7,10-tetraacetic acid (DOTA) manufactured by Sigma-Aldrich was used in Comparative Examples 11, 13, 16, and 18.

The separators obtained in the above Examples and Comparative Examples were used to carry out various measurements and tests described above. The test results are shown in Tables 1 and 2.

TABLE 1

|  |  |  |  |  | Example 1 | Example 2 | Example 3 | Example 4 |
|---|---|---|---|---|---|---|---|---|
| Separator | Microporous membrane | Resin composition | Polyethylene (A) | Mass ratio | 0.8 | 0.8 | 0.8 | 0.8 |
|  |  |  | Silane-modified polyethylene (B) | Mass ratio | 0.2 | 0.2 | 0.2 | 0.2 |
|  |  | Membrane thickness |  | μm | 12.0 | 12.0 | 11.5 | 12.1 |
|  |  | Porosity |  | % | 45 | 45 | 42 | 40 |
|  |  | Air permeability |  | sec/100 cm³ | 112 | 112 | 108 | 100 |
|  |  | Surface roughness |  | μm | 0.37 | 0.37 | 0.37 | 0.37 |
|  | Inorganic porous layer | Inorganic particle | Weight ratio | wt % | 94.60 | 94.60 | 97.50 | 94.60 |
|  |  |  | Dispersant | wt % | 0.40 | 0.40 | 0.40 | 0.40 |
|  |  |  | Type |  | — | AlO(OH) | AlO(OH) | AlO(OH) | AlO(OH) |
|  |  | Resin binder functional group | Type |  | — | Carboxyl | Carboxyl | Carboxyl | Carboxyl |
|  |  |  | Addition ratio (solid content) | wt % | 2 | 2 | 2 | 2 |
|  |  | Crosslinking agent functional group | Type |  | — | Oxazoline | Oxazoline | Oxazoline | Carbodiimide |
|  |  |  | Addition ratio (solid content) | wt % | 3 | 3 | 0.1 | 3 |
|  |  | Membrane thickness |  | μm | 2 | 6 | 2 | 2 |
|  | Shutdown temperature 1 |  |  | ° C. | 143 | 143 | 142 | 143 |
|  | Membrane rupture temperature 1 |  |  | ° C. | >200 | >200 | >200 | >200 |
|  | Increase in air permeability after coating |  |  | sec/100 cm³ | 32 | 90 | 28 | 31 |
| Battery | Battery cycle stability 1 |  |  | % | 98 | 99 | 87 | 98 |
|  | Battery destruction test 1 | Maximum heat generation rate |  | ° C./sec | 6 | 2 | 8 | 6 |
|  |  | Voltage drop (time for drop to 3 V) |  | sec | >300 | >300 | >300 | >300 |

|  |  |  |  |  | Example 5 | Example 6 | Example 7 | Example 8 |
|---|---|---|---|---|---|---|---|---|
| Separator | Microporous membrane | Resin composition | Polyethylene (A) | Mass ratio | 0.8 | 0.8 | 0.8 | 0.8 |
|  |  |  | Silane-modified polyethylene (B) | Mass ratio | 0.2 | 0.2 | 0.2 | 0.2 |
|  |  | Membrane thickness |  | μm | 12.2 | 12.6 | 11.2 | 10.9 |
|  |  | Porosity |  | % | 42 | 45 | 43 | 45 |
|  |  | Air permeability |  | sec/100 cm³ | 101 | 98 | 114 | 95 |
|  |  | Surface roughness |  | μm | 0.37 | 0.37 | 0.37 | 0.37 |
|  | Inorganic porous layer | Inorganic particle | Weight ratio | wt % | 94.60 | 94.60 | 94.60 | 94.60 |
|  |  |  | Dispersant | wt % | 0.40 | 0.40 | 0.40 | 0.40 |
|  |  |  | Type |  | — | AlO(OH) | AlO(OH) | AlO(OH) | AlO(OH) |
|  |  | Resin binder functional group | Type |  | — | Hydroxyl | Hydroxyl | Carboxyl | Carboxyl |
|  |  |  | Addition ratio (solid content) | wt % | 2 | 2 | 2 | 2 |
|  |  | Crosslinking agent functional group | Type |  | — | Isocyanate | Epoxy | Alkoxysilane | Amine/Alkoxysilane |
|  |  |  | Addition ratio (solid content) | wt % | 3 | 3 | 3 | 3 |
|  |  | Membrane thickness |  | μm | 2 | 2 | 2 | 2 |
|  | Shutdown temperature 1 |  |  | ° C. | 142 | 141 | 141 | 143 |
|  | Membrane rupture temperature 1 |  |  | ° C. | >200 | >200 | >200 | >200 |
|  | Increase in air permeability after coating |  |  | sec/100 cm³ | 34 | 32 | 35 | 28 |
| Battery | Battery cycle stability 1 |  |  | % | 98 | 96 | 98 | 97 |
|  | Battery destruction test 1 | Maximum heat generation rate |  | ° C./sec | 6 | 7 | 5 | 8 |
|  |  | Voltage drop (time for drop to 3 V) |  | sec | >300 | >300 | >300 | >300 |

|  |  |  |  |  | Example 9 | Example 10 | Example 11 | Example 12 |
|---|---|---|---|---|---|---|---|---|
| Separator | Microporous membrane | Resin composition | Polyethylene (A) | Mass ratio | 0.8 | 0.8 | 0.8 | 0.8 |
|  |  |  | Silane-modified polyethylene (B) | Mass ratio | 0.2 | 0.2 | 0.2 | 0.2 |
|  |  | Membrane thickness |  | μm | 11.2 | 10.2 | 11.2 | 12.0 |
|  |  | Porosity |  | % | 43 | 41 | 40 | 40 |
|  |  | Air permeability |  | sec/100 cm³ | 97 | 103 | 105 | 104 |
|  |  | Surface roughness |  | μm | 0.37 | 0.32 | 0.24 | 2.87 |
|  | Inorganic porous layer | Inorganic particle | Weight ratio | wt % | 92.60 | 97.50 | 94.60 | 94.60 |
|  |  |  | Dispersant | wt % | 0.40 | 0.40 | 0.40 | 0.40 |
|  |  |  | Type |  | — | AlO(OH) | AlO(OH) | AlO(OH) | AlO(OH) |
|  |  | Resin binder functional group | Type |  | — | Carboxyl | Carboxyl | Carboxyl | Carboxyl |
|  |  |  | Addition ratio (solid content) | wt % | 2 | 2 | 2 | 2 |
|  |  | Crosslinking agent functional group | Type |  | — | Alkoxysilane | Alkoxysilane | Oxazoline | Oxazoline |
|  |  |  | Addition ratio (solid content) | wt % | 5 | 0.1 | 3 | 3 |
|  |  | Membrane thickness |  | μm | 2 | 2 | 2 | 2 |
|  | Shutdown temperature 1 |  |  | ° C. | 143 | 145 | 143 | 144 |
|  | Membrane rupture temperature 1 |  |  | ° C. | >200 | >200 | >200 | >200 |
|  | Increase in air permeability after coating |  |  | sec/100 cm³ | 35 | 29 | 34 | 32 |

TABLE 1-continued

| Battery | Battery cycle stability 1 | | % | 95 | 97 | 96 | 97 |
|---|---|---|---|---|---|---|---|
| Battery destruction test 1 | Maximum heat generation rate | | °C./sec | 6 | 9 | 11 | 12 |
| | Voltage drop (time for drop to 3 V) | | sec | >300 | >300 | >300 | >300 |

TABLE 2

| | | | | | Example 13 | Example 14 | Comparative Example 1 | Comparative Example 2 |
|---|---|---|---|---|---|---|---|---|
| Separator | Microporous membrane | Resin composition | Polyethylene (A) | Mass ratio | 0.8 | 0.8 | 1.0 | 1.0 |
| | | | Silane-modified polyethylene (B) | Mass ratio | 0.2 | 0.2 | — | — |
| | | Membrane thickness | | μm | 12.0 | 12.5 | 13.0 | 10.2 |
| | | Porosity | | % | 43 | 45 | 42 | 42 |
| | | Air permeability | | sec/100 cm³ | 112 | 107 | 105 | 103 |
| | | Surface roughness | | μm | 0.09 | 3.31 | 0.37 | 0.23 |
| | Inorganic porous layer | Inorganic particle | Weight ratio | wt % | 94.60 | 94.60 | 97.59 | 85.60 |
| | | | Dispersant | wt % | 0.40 | 0.40 | 0.40 | 0.40 |
| | | | Type | — | AlO(OH) | AlO(OH) | AlO(OH) | AlO(OH) |
| | | Resin binder functional group | Type | — | Carboxyl | Carboxyl | Carboxyl | Carboxyl |
| | | | Addition ratio (solid content) | wt % | 2 | 2 | 2 | 13.99 |
| | | Crosslinking agent functional group | Type | — | Oxazoline | Oxazoline | Oxazoline | Oxazoline |
| | | | Addition ratio (solid content) | wt % | 3 | 3 | 0.01 | 0.01 |
| | | Membrane thickness | | μm | 2 | 2 | 2 | 2 |
| | Shutdown temperature 1 | | | °C. | 143 | 142 | 142 | 145 |
| | Membrane rupture temperature 1 | | | °C. | >200 | >200 | 183 | 179 |
| | Increase in air permeability after coating | | | sec/100 cm³ | 34 | 31 | 27 | 300 |
| Battery | Battery cycle stability 1 | | | % | 83 | 81 | 64 | 57 |
| | Battery destruction test 1 | Maximum heat generation rate | | °C./sec | 15 | 19 | 35 | 47 |
| | | Voltage drop (time for drop to 3 V) | | sec | 296 | 293 | 15 | 8 |

| | | | | | Comparative Example 3 | Comparative Example 4 | Comparative Example 5 | Comparative Example 6 |
|---|---|---|---|---|---|---|---|---|
| Separator | Microporous membrane | Resin composition | Polyethylene (A) | Mass ratio | 1.0 | 0.8 | 0.0 | 1.0 |
| | | | Silane-modified polyethylene (B) | Mass ratio | — | 0.2 | 1 | — |
| | | Membrane thickness | | μm | 12.0 | 12.0 | 12.0 | 12.5 |
| | | Porosity | | % | 43 | 41 | 38 | 39 |
| | | Air permeability | | sec/100 cm³ | 121 | 185 | 230 | 98 |
| | | Surface roughness | | μm | 2.81 | 0.37 | 0.37 | 0.37 |
| | Inorganic porous layer | Inorganic particle | Weight ratio | wt % | 85.60 | 97.60 | 85.60 | 97.60 |
| | | | Dispersant | wt % | 0.40 | 0.40 | 0.40 | 0.40 |
| | | | Type | — | AlO(OH) | AlO(OH) | AlO(OH) | AlO(OH) |
| | | Resin binder functional group | Type | — | Carboxyl | Carboxyl | Carboxyl | Carboxyl |
| | | | Addition ratio (solid content) | wt % | 13.99 | 2 | 14 | 2 |
| | | Crosslinking agent functional group | Type | — | Oxazoline | — | — | — |
| | | | Addition ratio (solid content) | wt % | 0.01 | — | — | — |
| | | Membrane thickness | | μm | 2 | 2 | 2 | 2 |
| | Shutdown temperature 1 | | | °C. | 143 | 144 | 128 | 145 |
| | Membrane rupture temperature 1 | | | °C. | 176 | 172 | 173 | 173 |
| | Increase in air permeability after coating | | | sec/100 cm³ | 310 | 27 | 300 | 28 |
| Battery | Battery cycle stability 1 | | | % | 53 | 31 | 25 | 32 |
| | Battery destruction test 1 | Maximum heat generation rate | | °C./sec | 41 | 57 | 55 | 61 |
| | | Voltage drop (time for drop to 3 V) | | sec | 7 | 5 | 5 | 2 |

| | | | | | Comparative Example 7 | Comparative Example 8 | Comparative Example 9 | Comparative Example 10 |
|---|---|---|---|---|---|---|---|---|
| Separator | Microporous membrane | Resin composition | Polyethylene (A) | Mass ratio | 1.0 | 1.0 | 1.0 | 1.0 |
| | | | Silane-modified polyethylene (B) | Mass ratio | — | — | — | — |
| | | Membrane thickness | | μm | 12.5 | 11.8 | 12.5 | 12.2 |
| | | Porosity | | % | 38 | 41 | 41 | 42 |
| | | Air permeability | | sec/100 cm³ | 96 | 109 | 101 | 108 |
| | | Surface roughness | | μm | 0.37 | 0.37 | 0.37 | 0.37 |
| | Inorganic porous layer | Inorganic particle | Weight ratio | wt % | 97.60 | 89.60 | 97.60 | 95.60 |
| | | | Dispersant | wt % | 0.40 | 0.40 | 0.40 | 0.40 |
| | | | Type | — | AlO(OH) | AlO(OH) | AlO(OH) | AlO(OH) |
| | | Resin binder | Type | — | Carboxyl | Carboxyl | Carboxyl | Carboxyl |

TABLE 2-continued

|   |   |   |   |   |   |   |   |   |
|---|---|---|---|---|---|---|---|---|
| | | functional group | Addition ratio (solid content) | wt % | 2 | 10 | 2 | 2 |
| | | Crosslinking agent functional group | Type | — | — | — | Zn colloid | Polyfunctional metal ion chelating compound (EDTA) |
| | | | Addition ratio (solid content) | wt % | — | — | 2 | 2 |
| | | Membrane thickness | | μm | 6 | 2 | 2 | 2 |
| | Shutdown temperature 1 | | | ° C. | 144 | 143 | 143 | 142 |
| | Membrane rupture temperature 1 | | | ° C. | 172 | 173 | 175 | 178 |
| | Increase in air permeability after coating | | | sec/100 cm³ | 95 | 120 | 53 | 56 |
| Battery | Battery cycle stability 1 | | | % | 37 | 28 | 35 | 45 |
| | Battery destruction test 1 | Maximum heat generation rate | | ° C./sec | 68 | 63 | 57 | 48 |
| | | Voltage drop (time for drop to 3 V) | | sec | 3 | 1 | 7 | 9 |

|   |   |   |   |   |   | Comparative Example 11 | Comparative Example 12 | Comparative Example 13 |
|---|---|---|---|---|---|---|---|---|
| Separator | Microporous membrane | Resin composition | Polyethylene (A) | Mass ratio | | 1.0 | 1.0 | 1.0 |
| | | | Silane-modified polyethylene (B) | Mass ratio | | — | — | — |
| | | Membrane thickness | | μm | | 11.2 | 12.5 | 12.7 |
| | | Porosity | | % | | 40 | 40 | 42 |
| | | Air permeability | | sec/100 cm³ | | 102 | 104 | 103 |
| | | Surface roughness | | μm | | 0.37 | 0.37 | 0.37 |
| | Inorganic porous layer | Inorganic particle | Weight ratio | wt % | | 95.60 | 87.60 | 87.60 |
| | | | Dispersant | wt % | | 0.40 | 0.40 | 0.40 |
| | | | Type | — | | AlO(OH) | AlO(OH) | AlO(OH) |
| | | Resin binder functional group | Type | — | | Carboxyl | Carboxyl | Carboxyl |
| | | | Addition ratio (solid content) | wt % | | 2 | 2 | 2 |
| | | Crosslinking agent functional group | Type | — | | Polyfunctional carboxylic acid compound (DOTA) | Polyfunctional carboxylic acid compound (DOTA) | Polyfunctional carboxylic acid compound (DOTA) |
| | | | Addition ratio (solid content) | wt % | | 2 | 10 | 10 |
| | | Membrane thickness | | μm | | 2 | 2 | 2 |
| | Shutdown temperature 1 | | | ° C. | | 141 | 143 | 145 |
| | Membrane rupture temperature 1 | | | ° C. | | 177 | 176 | 177 |
| | Increase in air permeability after coating | | | sec/100 cm³ | | 42 | 52 | 48 |
| Battery | Battery cycle stability 1 | | | % | | 49 | 53 | 55 |
| | Battery destruction test 1 | Maximum heat generation rate | | ° C./sec | | 46 | 47 | 45 |
| | | Voltage drop (time for drop to 3 V) | | sec | | 11 | 9 | 12 |

|   |   |   |   |   |   | Comparative Example 14 | Comparative Example 15 | Comparative Example 16 | Comparative Example 17 | Comparative Example 18 |
|---|---|---|---|---|---|---|---|---|---|---|
| Separator | Microporous membrane | Resin composition | Polyethylene (A) | Mass ratio | | 0.8 | 0.8 | 0.8 | 0.8 | 0.8 |
| | | | Silane-modified polyethylene (B) | Mass ratio | | 0.2 | 0.2 | 0.2 | 0.2 | 0.2 |
| | | Membrane thickness | | μm | | 11.4 | 12.2 | 13.2 | 13.0 | 12.8 |
| | | Porosity | | % | | 40 | 52 | 48 | 49 | 51 |
| | | Air permeability | | sec/100 cm³ | | 102 | 179 | 190 | 166 | 158 |
| | | Surface roughness | | μm | | 0.37 | 0.37 | 0.37 | 0.37 | 0.37 |
| | Inorganic porous layer | Inorganic particle | Weight ratio | wt % | | 97.60 | 95.60 | 95.60 | 87.60 | 87.60 |
| | | | Dispersant | wt % | | 0.40 | 0.40 | 0.40 | 0.40 | 0.40 |
| | | | Type | — | | AlO(OH) | AlO(OH) | AlO(OH) | AlO(OH) | AlO(OH) |
| | | Resin binder functional group | Type | — | | Carboxyl | Carboxyl | Carboxyl | Carboxyl | Carboxyl |
| | | | Addition ratio (solid content) | wt % | | 2 | 2 | 2 | 2 | 2 |
| | | Crosslinking agent functional group | Type | — | | Zn colloid | Polyfunctional metal ion chelating compound (EDTA) | Polyfunctional carboxylic acid compound (DOTA) | Polyfunctional metal ion chelating compound (EDTA) | Polyfunctional carboxylic acid compound (DOTA) |
| | | | Addition ratio (solid content) | wt % | | 2 | 2 | 2 | 10 | 10 |
| | | Membrane thickness | | μm | | 2 | 2 | 2 | 2 | 2 |
| | Shutdown temperature 1 | | | ° C. | | 142 | 143 | 142 | 142 | 143 |
| | Membrane rupture temperature 1 | | | ° C. | | 182 | 181 | 180 | 182 | 181 |
| | Increase in air permeability after coating | | | sec/100 cm³ | | 55 | 51 | 45 | 57 | 51 |

TABLE 2-continued

| Battery | Battery cycle | stability 1 | % | 33 | 42 | 46 | 51 | 52 |
|---|---|---|---|---|---|---|---|---|
| | Battery destruction test 1 | Maximum heat generation rate | °C./sec | 42 | 41 | 42 | 40 | 39 |
| | | Voltage drop (time for drop to 3 V) | sec | 13 | 14 | 14 | 13 | 14 |

Example 15

(Manufacturing of Polyolefin Microporous Membrane)

A polymer mixture was obtained by adding 1% by weight of pentaerythrityl-tetrakis-[3-(3,5-di-t-butyl-4-hydroxyphenyl)propionate] as an antioxidant to 99% by weight of a polyethylene homopolymer (PE (A)) having a weight-average molecular weight of 700,000 and dry-blending using a tumbler blender again. After purging with nitrogen, the obtained polymer mixture was then fed into a twin-screw extruder by a feeder in a nitrogen atmosphere. Liquid paraffin (kinematic viscosity of $7.59 \times 10^{-5}$ m$^2$/s at 37.78° C.) was injected into the extruder cylinder by a plunger pump.

The feeder and the pump were adjusted so that the ratio of liquid paraffin in the entire melt-kneaded and extruded mixture was 70% by weight (i.e., the polymer concentration is 30% by weight). The melt-kneading was carried out under the conditions of a set temperature of 230° C., a screw rotational speed of 240 rpm, and a discharge rate of 18 kg/h.

Subsequently, the melt-kneaded product was extruded via a T-die and cast on a cooling roll controlled to a surface temperature of 25° C. to obtain a gel sheet having an original membrane thickness of 1400 μm, which was then introduced to a simultaneous biaxial tenter stretching machine and biaxially stretched to obtain a stretched product. The set stretching conditions were a MD ratio of 7.0, a TD ratio of 6.0 (i.e., a 7×6 ratio), and a biaxial stretching temperature of 125° C. The stretched gel sheet was then introduced into a tank of methyl ethyl ketone and sufficiently immersed in the methyl ethyl ketone to extract away the liquid paraffin. Thereafter, the methyl ethyl ketone was dried away to obtain a porous body. The porous body was then introduced to a TD tenter for heat setting (may be abbreviated as "HS"), which was carried out at a heat setting temperature of 125° C. and a stretching ratio of 1.8. Thereafter, a relaxation operation was carried out to a ratio of 1.2 in the TD. The obtained microporous membrane was then cut at the ends and wound as a mother roll having a width of 1100 mm and a length of 5000 m. The membrane thickness, air permeability, porosity, and surface roughness of the obtained membrane were measured and shown in Table 3.

(Manufacturing of Inorganic Porous Layer)
(Method for Producing Acrylic Latex)

The acrylic latex to be used as the resin binder is produced by the following method. 70.4 parts by weight of ion-exchanged water and 0.5 parts by weight of "AQUALON KH1025" (registered trademark of Daiichi Kogyo Seiyaku Co., Ltd., 25% aqueous solution) and 0.5 parts by weight of "ADEKA REASOAP SR1025" (registered trademark of Adeka Corp., 25% aqueous solution) as emulsifiers were charged into a reactor equipped with a stirrer, a reflux condenser, a drip tank, and a thermometer. The internal temperature of the reactor was then raised to 80° C., and 7.5 parts by weight of a 2% aqueous solution of ammonium persulfate was added while maintaining the temperature at 80° C. to obtain an initial mixture. 5 min after the addition of the ammonium persulfate aqueous solution was completed, an emulsified liquid was added dropwise from the drip tank into the reactor over a period of 150 min.

The above emulsified liquid was prepared by forming a mixture of 70 parts by weight of butyl acrylate; 29 parts by weight of methyl methacrylate; 1 part by weight of methacrylic acid; 3 parts by weight of "AQUALON KH1025" (registered trademark of Daiichi Kogyo Seiyaku Co., Ltd., 25% aqueous solution) and 3 parts by weight of "ADEKA REASOAP SR1025" (registered trademark of Adeka Corp., 25% aqueous solution) as emulsifiers; 7.5 parts by weight of a 2% aqueous solution of ammonium persulfate; and 52 parts by weight of ion-exchanged water, and mixing with a homomixer for 5 min.

Upon completion of the dropwise addition of the emulsified liquid, the internal temperature of the reactor was maintained at 80° C. for 90 min, and thereafter cooled to room temperature. The obtained emulsion was adjusted to a pH of 8.0 with a 25% aqueous solution of ammonium hydroxide, and then a small amount of water was added to obtain an acrylic latex with a solid content of 40%. The obtained acrylic latex had a number-average particle size of 145 nm and a glass transition temperature of −23° C.

(Formation of Inorganic Porous Layer)

A dispersion was prepared by uniformly dispersing 94.6% by weight of aluminum hydroxide oxide (average particle size of 1.4 μm) as inorganic particles and 0.40% by weight (in terms of solid content) of an ammonium polycarboxylate aqueous solution (SN-DISPERSANT 5468, solid content concentration of 40%, manufactured by San Nopco Ltd.) as an ionic dispersant in 100% by weight of water. The obtained dispersion was crushed by a bead mill (cell volume of 200 cc, zirconia bead size of 0.1 mm, filling amount of 80%), and the particle size distribution of the inorganic particles was adjusted to D50=1.0 μm. 2.0% by weight (in terms of solid content) of acrylic latex (solid content concentration of 40%, average particle size of 145 nm, glass transition temperature of −23° C., constituent monomer: butyl acrylate) as a resin binder was added to the dispersion with the adjusted particle size distribution, followed by adding 3.0% by weight (in terms of solid content) of EPOCROS K-2010E manufactured by Nippon Shokubai Co., Ltd. as a crosslinking agent to produce an inorganic particle-containing slurry.

A microporous membrane was then continuously drawn out from the above microporous membrane mother roll. The microporous membrane was coated on one side with the inorganic particle-containing slurry by a gravure reverse coater, dried in a dryer at 60° C. to remove the water, and wound to obtain a separator mother roll.

During evaluation, the separator unwound from the mother roll was slit as needed and used as an evaluation separator.

Examples 16 to 27 and Comparative Examples 19 to 29

By adjusting the HS ratios and stretching temperatures, separators having various physical properties were fabricated according to the same method as in Example 15. Note that, the crosslinking agent of Examples 16 and 24 to 27 and Comparative Examples 19 to 21 was EPOCROS K-2010E manufactured by Nippon Shokubai Co., Ltd., the crosslinking agent of Example 17 was Carbodilite V-02 manufactured by Nisshinbo Chemical Inc., the crosslinking agent of Example 18 was Duranate WB40-100 manufactured by Asahi Kasei Corp., and Denacol EX-61B manufactured by Nagase ChemteX Corp. was used in Example 19 as an epoxy-based crosslinking agent. An alkoxy oligomer (KR-500) manufactured by Shin-Etsu Chemical Co., Ltd. was used in Examples 20, 22, and 23. 3-Aminopropyltrimethoxysilane KBM-903 manufactured by Shin-Etsu Chemical Co., Ltd. was used in Example 21. A hardener 12A manufactured by Asahi Kasei Corp. was used in Comparative Example 25. Ethylenediaminetetraacetic acid (EDTA) manufactured by Sigma-Aldrich was used in Comparative Examples 26 and 28. 1,4,7,10-Tetraazacylododecane-1,4,7,10-tetraacetic acid (DOTA) manufactured by Sigma-Aldrich was used in Comparative Examples 27 and 29.

The various tests described above were carried out using the separators obtained by the above Examples and Comparative Examples. The test results are shown in Tables 3 and 4. The unit "% by weight" is expressed as "wt %" in the tables.

TABLE 3

| | | | | | Example 15 | Example 16 | Example 17 |
|---|---|---|---|---|---|---|---|
| Separator | Microporous membrane | Membrane thickness | | μm | 12.0 | 11.5 | 12.1 |
| | | Porosity | | % | 45 | 42 | 40 |
| | | Air permeability | | sec/100 cm³ | 112 | 108 | 100 |
| | | Surface roughness | | μm | 0.33 | 0.33 | 0.33 |
| | Inorganic porous layer | Inorganic particle | Weight ratio | wt % | 94.60 | 97.50 | 94.60 |
| | | | Dispersant | wt % | 0.40 | 0.40 | 0.40 |
| | | | Type | — | AlO(OH) | AlO(OH) | AlO(OH) |
| | | Resin binder | Type | — | Carboxyl | Carboxyl | Carboxyl |
| | | | functional group Addition ratio (solid content) | wt % | 2 | 2 | 2 |
| | | Crosslinking agent | Type | — | Oxazoline | Oxazoline | Carbodiimide |
| | | | functional group Addition ratio (solid content) | wt % | 3 | 0.1 | 3 |
| | | Membrane thickness | | μm | 2 | 2 | 2 |
| | Solvent immersion test: percentage of peeled area | | | % | 1.2 | 34.5 | 0 |
| | Shutdown temperature 1 | | | °C. | 143 | 142 | 143 |
| | Membrane rupture temperature 1 | | | °C. | >200 | >200 | >200 |
| | Increase in air permeability after coating | | | sec/100 cm³ | 32 | 28 | 31 |
| Battery | Battery cycle stability 1 | | | % | 98 | 87 | 98 |
| | Battery destruction test 1 | Maximum heat generation rate | | °C./sec | 6 | 8 | 6 |
| | | Voltage drop (time for drop to 3 V) | | sec | >300 | >300 | >300 |

| | | | | | Example 18 | Example 19 | Example 20 |
|---|---|---|---|---|---|---|---|
| Separator | Microporous membrane | Membrane thickness | | μm | 12.2 | 12.6 | 11.2 |
| | | Porosity | | % | 42 | 45 | 43 |
| | | Air permeability | | sec/100 cm³ | 101 | 98 | 114 |
| | | Surface roughness | | μm | 0.33 | 0.33 | 0.33 |
| | Inorganic porous layer | Inorganic particle | Weight ratio | wt % | 94.60 | 94.60 | 94.60 |
| | | | Dispersant | wt % | 0.40 | 0.40 | 0.40 |
| | | | Type | — | AlO(OH) | AlO(OH) | AlO(OH) |
| | | Resin binder | Type | — | Hydroxyl | Hydroxyl | Carboxyl |
| | | | functional group Addition ratio (solid content) | wt % | 2 | 2 | 2 |
| | | Crosslinking agent | Type | — | Isocyanate | Epoxy | Alkoxysilane |
| | | | functional group Addition ratio (solid content) | wt % | 3 | 3 | 3 |
| | | Membrane thickness | | μm | 2 | 2 | 2 |
| | Solvent immersion test: percentage of peeled area | | | % | 0 | 0 | 0 |
| | Shutdown temperature 1 | | | °C. | 142 | 141 | 141 |
| | Membrane rupture temperature 1 | | | °C. | >200 | >200 | >200 |
| | Increase in air permeability after coating | | | sec/100 cm³ | 34 | 32 | 35 |
| Battery | Battery cycle stability 1 | | | % | 98 | 96 | 98 |
| | Battery destruction test 1 | Maximum heat generation rate | | °C./sec | 6 | 7 | 5 |
| | | Voltage drop (time for drop to 3 V) | | sec | >300 | >300 | >300 |

TABLE 3-continued

|  |  |  |  |  | Example 21 | Example 22 | Example 23 | Example 24 |
|---|---|---|---|---|---|---|---|---|
| Separator | Microporous membrane | Membrane thickness | | μm | 10.9 | 11.2 | 10.2 | 11.2 |
|  |  | Porosity | | % | 45 | 43 | 41 | 40 |
|  |  | Air permeability | | sec/100 cm³ | 95 | 97 | 103 | 105 |
|  |  | Surface roughness | | μm | 0.33 | 0.33 | 0.33 | 0.21 |
|  | Inorganic porous layer | Inorganic particle | Weight ratio | wt % | 94.60 | 92.60 | 97.50 | 94.60 |
|  |  |  | Dispersant | wt % | 0.40 | 0.40 | 0.40 | 0.40 |
|  |  |  | Type | | — | AlO(OH) | AlO(OH) | AlO(OH) |
|  |  | Resin binder functional group | Type | | — | Carboxyl | Carboxyl | Carboxyl |
|  |  |  | Addition ratio (solid content) | wt % | 2 | 2 | 2 | 2 |
|  |  | Crosslinking agent functional group | Type | | — | Amine/Alkoxy-silane | Alkoxy-silane | Alkoxy-silane | Oxa-zoline |
|  |  |  | Addition ratio (solid content) | wt % | | 3 | 5 | 0.1 | 3 |
|  |  | Membrane thickness | | μm | 2 | 2 | 2 | 2 |
|  | Solvent immersion test: percentage of peeled area | | | % | 0 | 0 | 34 | 0 |
|  | Shutdown temperature 1 | | | °C. | 143 | 143 | 145 | 143 |
|  | Membrane rupture temperature 1 | | | °C. | >200 | >200 | >200 | >200 |
|  | Increase in air permeability after coating | | | sec/100 cm³ | 28 | 35 | 29 | 34 |
| Battery | Battery cycle stability 1 | | | % | 97 | 95 | 97 | 96 |
|  | Battery destruction test 1 | Maximum heat generation rate | | °C./sec | 8 | 6 | 9 | 11 |
|  |  | Voltage drop (time for drop to 3 V) | | sec | >300 | >300 | >300 | >300 |

|  |  |  |  |  | Example 25 | Example 26 | Example 27 |
|---|---|---|---|---|---|---|---|
| Separator | Microporous membrane | Membrane thickness | | μm | 12.0 | 12.0 | 12.5 |
|  |  | Porosity | | % | 40 | 43 | 45 |
|  |  | Air permeability | | sec/100 cm³ | 104 | 112 | 107 |
|  |  | Surface roughness | | μm | 2.83 | 0.12 | 3.27 |
|  | Inorganic porous layer | Inorganic particle | Weight ratio | wt % | 94.60 | 94.60 | 94.60 |
|  |  |  | Dispersant | wt % | 0.40 | 0.40 | 0.40 |
|  |  |  | Type | | AlO(OH) | AlO(OH) | AlO(OH) |
|  |  | Resin binder functional group | Type | | Carboxyl | Carboxyl | Carboxyl |
|  |  |  | Addition ratio (solid content) | wt % | 2 | 2 | 2 |
|  |  | Crosslinking agent functional group | Type | | Oxa-zoline | Oxa-zoline | Oxa-zoline |
|  |  |  | Addition ratio (solid content) | wt % | 3 | 3 | 3 |
|  |  | Membrane thickness | | μm | 2 | 2 | 2 |
|  | Solvent immersion test: percentage of peeled area | | | % | 0 | 33 | 34 |
|  | Shutdown temperature 1 | | | °C. | 144 | 143 | 142 |
|  | Membrane rupture temperature 1 | | | °C. | >200 | >200 | >200 |
|  | Increase in air permeability after coating | | | sec/100 cm³ | 32 | 34 | 31 |
| Battery | Battery cycle stability 1 | | | % | 97 | 83 | 81 |
|  | Battery destruction test 1 | Maximum heat generation rate | | °C./sec | 12 | 15 | 19 |
|  |  | Voltage drop (time for drop to 3 V) | | sec | >300 | 296 | 293 |

TABLE 4

|  |  |  |  | Comparative Example 19 | Comparative Example 20 | Comparative Example 21 | Comparative Example 22 | Comparative Example 23 | Comparative Example 24 |
|---|---|---|---|---|---|---|---|---|---|
| Separator | Microporous membrane | Membrane thickness | μm | 13.0 | 10.2 | 12.0 | 12.5 | 12.5 | 11.8 |
|  |  | Porosity | % | 42 | 42 | 43 | 39 | 38 | 41 |
|  |  | Air permeability | sec/100 cm³ | 105 | 103 | 121 | 98 | 96 | 109 |
|  |  | Surface roughness | μm | 0.33 | 0.21 | 2.83 | 0.33 | 0.33 | 0.33 |

TABLE 4-continued

|  |  |  |  |  |  |  |  |  |  |
|---|---|---|---|---|---|---|---|---|---|
|  | Inorganic porous layer | Inorganic particle | Weight ratio | wt % | 97.59 | 97.59 | 97.59 | 97.60 | 97.60 | 89.60 |
|  |  |  | Dispersant | wt % | 0.40 | 0.40 | 0.40 | 0.40 | 0.40 | 0.40 |
|  |  |  | Type | — | AlO(OH) | AlO(OH) | AlO(OH) | AlO(OH) | AlO(OH) | AlO(OH) |
|  |  | Resin binder | Type | — | Carboxyl | Carboxyl | Carboxyl | Carboxyl | Carboxyl | Carboxyl |
|  |  | functional group | Addition ratio (solid content) | wt % | 2 | 2 | 2 | 2 | 2 | 10 |
|  |  | Crosslinking agent functional group | Type | — | Oxazoline | Oxazoline | Oxazoline | — | — | — |
|  |  |  | Addition ratio (solid content) | wt % | 0.01 | 0.01 | 0.01 | — | — | — |
|  |  | Membrane thickness |  | μm | 2 | 2 | 2 | 2 | 6 | 2 |
|  | Solvent immersion test: percentage of peeled area |  |  | % | 37 | 65 | 58 | 87 | 85 | 81 |
|  | Shutdown temperature 1 |  |  | ° C. | 142 | 145 | 143 | 145 | 144 | 143 |
|  | Membrane rupture temperature 1 |  |  | ° C. | 183 | 179 | 176 | 173 | 172 | 173 |
|  | Increase in air permeability after coating |  |  | sec/100 cm$^3$ | 27 | 30 | 31 | 28 | 95 | 120 |
| Battery | Battery cycle stability 1 |  |  | % | 64 | 57 | 53 | 32 | 37 | 28 |
|  | Battery destruction test 1 | Maximum heat generation rate |  | ° C./sec | 35 | 47 | 41 | 61 | 68 | 63 |
|  |  | Voltage drop (time for drop to 3 V) |  | sec | 15 | 8 | 7 | 2 | 3 | 1 |

|  |  |  |  |  | Comparative Example 25 | Comparative Example 26 | Comparative Example 27 | Comparative Example 28 | Comparative Example 29 |
|---|---|---|---|---|---|---|---|---|---|
| Separator | Microporous membrane | Membrane thickness |  | μm | 12.5 | 12.2 | 11.2 | 12.5 | 12.7 |
|  |  | Porosity |  | % | 41 | 42 | 40 | 40 | 42 |
|  |  | Air permeability |  | sec/100 cm$^3$ | 101 | 108 | 102 | 104 | 103 |
|  |  | Surface roughness |  | μm | 0.33 | 0.33 | 0.33 | 0.33 | 0.33 |
|  | Inorganic porous layer | Inorganic particle | Weight ratio | wt % | 95.60 | 95.60 | 95.60 | 87.60 | 87.60 |
|  |  |  | Dispersant | wt % | 0.40 | 0.40 | 0.40 | 0.40 | 0.40 |
|  |  |  | Type | — | AlO(OH) | AlO(OH) | AlO(OH) | AlO(OH) | AlO(OH) |
|  |  | Resin binder | Type | — | Carboxyl | Carboxyl | Carboxyl | Carboxyl | Carboxyl |
|  |  | functional group | Addition ratio (solid content) | wt % | 2 | 2 | 2 | 2 | 2 |
|  |  | Crosslinking agent functional group | Type | — | Zn colloid | Polyfunctional metal ion chelating compound (EDTA) | Polyfunctional carboxylic acid compound (DOTA) | Polyfunctional metal ion chelating compound (EDTA) | Polyfunctional carboxylic acid compound (DOTA) |
|  |  |  | Addition ratio (solid content) | wt % | 2 | 2 | 2 | 10 | 10 |
|  |  | Membrane thickness |  | μm | 2 | 2 | 2 | 2 | 2 |
|  | Solvent immersion test: percentage of peeled area |  |  | % | 71 | 67 | 65 | 65 | 67 |
|  | Shutdown temperature 1 |  |  | ° C. | 143 | 142 | 141 | 143 | 145 |
|  | Membrane rupture temperature 1 |  |  | ° C. | 175 | 178 | 177 | 176 | 177 |
|  | Increase in air permeability after coating |  |  | sec/100 cm$^3$ | 53 | 56 | 42 | 52 | 48 |
| Battery | Battery cycle stability 1 |  |  | % | 35 | 45 | 49 | 53 | 55 |
|  | Battery destruction test 1 | Maximum heat generation rate |  | ° C./sec | 57 | 48 | 46 | 47 | 45 |
|  |  | Voltage drop (time for drop to 3 V) |  | sec | 7 | 9 | 11 | 9 | 12 |

Example 28

(Manufacturing of Silane-Crosslinkable Polyolefin Microporous Membrane)

A mixture was obtained by combining 19.8% by weight of the silane-modified polyethylene (B) obtained above with 79.2% by weight of a polyethylene homopolymer (A) having a weight-average molecular weight of 800,000 to form a resin formulation, which was a resin composition of polyethylenes (A) to (B) at 0.8 and 0.2, respectively, adding to the formulation 1% by weight of pentaerythrityl-tetrakis-[3-(3,5-di-t-butyl-4-hydroxyphenyl)propionate] as an antioxidant, and dry-blending using a tumbler blender. The obtained mixture was then fed into a twin-screw extruder by a feeder in a nitrogen atmosphere. Liquid paraffin (kinematic viscosity of 7.59×10$^{-5}$ m$^2$/s at 37.78° C.) was injected into the extruder cylinder by a plunger pump.

The mixture and the liquid paraffin were melt-kneaded in the extruder, and the feeder and the pump were adjusted so that the ratio of liquid paraffin in the extruded polyolefin composition was 70% by weight (i.e., the polymer concentration is 30% by weight). The melt-kneading conditions were a set temperature of 220° C., a screw rotational speed of 300 rpm, and a discharge rate of 18 kg/h.

Subsequently, the melt-kneaded product was extruded via a T-die and cast on a cooling roll controlled to a surface temperature of 25° C. to obtain a gel sheet (sheet-like molded body) having an original membrane thickness of 1150 μm.

The sheet-like molded body was then introduced to a simultaneous biaxial tenter stretching machine and biaxially stretched to obtain a stretched product. The set stretching conditions were a MD ratio of 7.0, a TD ratio of 6.7, and a biaxial stretching temperature of 119° C.

The stretched gel sheet was then introduced into a tank of dichloromethane and sufficiently immersed in the dichloromethane to extract away the liquid paraffin. Thereafter, the dichloromethane was dried away to obtain a porous body.

The porous body was then introduced to a TD tenter for heat setting (HS), which was carried out at a heat setting temperature of 132° C. and a stretching ratio of 2.1. Thereafter, a relaxation operation was carried out to a ratio of 1.7 in the TD.

The obtained microporous membrane was then cut at the ends and wound as a mother roll having a width of 1,100 mm and a length of 5,000 m.

For the above evaluation, the microporous membrane unwound from the mother roll was slit as needed and used as an evaluation microporous membrane.

The membrane thickness, surface roughness, air permeability, and porosity of the obtained evaluation microporous membrane were measured and shown in Table 5.
(Manufacturing of Inorganic Porous Layer)
(Method for Producing Acrylic Latex)

The acrylic latex to be used as the resin binder is produced by the following method.

70.4 parts by weight of ion-exchanged water and 0.5 parts by weight of "AQUALON KH1025" (registered trademark of Daiichi Kogyo Seiyaku Co., Ltd., 25% aqueous solution) and 0.5 parts by weight of "ADEKA REASOAP SR1025" (registered trademark of Adeka Corp., 25% aqueous solution) as emulsifiers were charged into a reactor equipped with a stirrer, a reflux condenser, a drip tank, and a thermometer. The internal temperature of the reactor was then raised to 80° C., and 7.5 parts by weight of a 2% aqueous solution of ammonium persulfate was added while maintaining the temperature at 80° C. to obtain an initial mixture. 5 min after the addition of the ammonium persulfate aqueous solution was completed, an emulsified liquid was added dropwise from the drip tank into the reactor over a period of 150 min.

The above emulsified liquid was prepared by forming a mixture of 70 parts by weight of butyl acrylate; 29 parts by weight of methyl methacrylate; 1 part by weight of methacrylic acid; 3 parts by weight of "AQUALON KH1025" (registered trademark of Daiichi Kogyo Seiyaku Co., Ltd., 25% aqueous solution) and 3 parts by weight of "ADEKA REASOAP SR1025" (registered trademark of Adeka Corp., 25% aqueous solution) as emulsifiers; 7.5 parts by weight of a 2% aqueous solution of ammonium persulfate; and 52 parts by weight of ion-exchanged water, and mixing with a homomixer for 5 min.

Upon completion of the dropwise addition of the emulsified liquid, the internal temperature of the reactor was maintained at 80° C. for 90 min, and thereafter cooled to room temperature. The obtained emulsion was adjusted to a pH of 8.0 with a 25% aqueous ammonium hydroxide solution, and then a small amount of water was added to obtain an acrylic latex with a solid content of 40%. The obtained acrylic latex had a number-average particle size of 145 nm and a glass transition temperature of −20° C.
(Formation of Inorganic Porous Layer)

A dispersion was prepared by uniformly dispersing 94.60 parts by weight of aluminum hydroxide oxide (average particle size of 1.4 win) as inorganic particles and 0.40 parts by weight (in terms of solid content) of an ammonium polycarboxylate aqueous solution (SN-DISPERSANT 5468, solid content concentration of 40%, manufactured by San Nopco Ltd.) as an ionic dispersant in 100 parts by weight of water. The obtained dispersion was crushed by a bead mill (cell volume of 200 cc, zirconia bead size of 0.1 mm, filling amount of 80%), and the particle size distribution of the inorganic particles was adjusted to D50=0.8 µm. 2 parts by weight (in terms of solid content) of acrylic latex (solid content concentration of 40%, average particle size of 145 nm, glass transition temperature of −20° C., constituent monomer:butyl acrylate) as a resin binder was added to the dispersion with the adjusted particle size distribution, followed by adding 3 parts by weight (in terms of solid content) of EPOCROS K-2010E manufactured by Nippon Shokubai Co., Ltd. as a crosslinking agent to produce an inorganic particle-containing slurry.

A microporous membrane was then continuously drawn out from the above microporous membrane mother roll. The microporous membrane was coated on one side with the inorganic particle-containing slurry by a gravure reverse coater, dried in a dryer at 60° C. to remove the water, and wound to obtain a separator mother roll.

During evaluation, the separator unwound from the mother roll was slit as needed and used as an evaluation separator.

Examples 29 to 41 and Comparative Examples 30 to 44

Except that the presence of the silane-modified polyethylene (B), various starting material compositions, HS ratios, and stretching temperatures were adjusted as indicated in Table 5 or Table 6, separators having various physical properties were fabricated according to the same method as in Example 28. Note that, the crosslinking agent of Examples 29, 30, and 38 to 41 was EPOCROS K-2010E manufactured by Nippon Shokubai Co., Ltd., the crosslinking agent of Example 31 was Carbodilite V-02 manufactured by Nisshinbo Chemical Inc., the crosslinking agent of Example 32 was Duranate WB40-100 manufactured by Asahi Kasei Corp., and Denacol EX-61B manufactured by Nagase ChemteX Corp. was used in Example 33 as an epoxy-based crosslinking agent. Tetraethoxysilane manufactured by Shin-Etsu Chemical Co., Ltd. was used in Examples 34, 36, and 37. 3-Aminopropyltrimethoxysilane KBM-903 manufactured by Shin-Etsu Chemical Co., Ltd. was used in Example 35. A hardener 12A manufactured by Asahi Kasei Corp. was used in Comparative Examples 35 and 40. Ethylenediaminetetraacetic acid (EDTA) manufactured by Sigma-Aldrich was used in Comparative Examples 36, 38, 41, and 43. 1,4,7,10-Tetraazacylododecane-1,4,7,10-tetraacetic acid (DOTA) manufactured by Sigma-Aldrich was used in Comparative Examples 37, 39, 42, and 44.

The separators obtained in the above Examples and Comparative Examples were used to carry out various measurements and tests described above, particularly the solvent immersion test, F/MD measurement, measurement of the increase in air permeability after coating, battery cycle test, and battery destruction test. The test results are shown in Tables 5 and 6. Note that, in Examples 28 to 41 and Comparative Examples 30 to 44, the positive electrode active material was changed to $LiNi_{3/5}Mn_{1/5}Co_{1/5}O_2$, which has a lower thermal stability than $LiCoO_2$, and the speed of the nail driven into the battery was changed from 20 mm/sec to 30 mm/sec, as indicated below, thus making the evaluation system more stringent than the above "Battery cycle stability 1" and "Battery destruction test 1". The tests are indicated as "Battery cycle stability 2" and "Battery destruction test 2" in Table 5 and Table 6.
(12) Battery Cycle Stability 2 (Cycle Test 2) and Battery Destruction Test 2 (Nail Penetration Test 2)
a. Fabrication of Positive Electrode A slurry solution was prepared by mixing $LiNi_{3/5}Mn_{1/5}Co_{1/5}O_2$ as a positive electrode active material, carbon black as a conductive aid, a polyvinylidene fluoride solution as a binder at a solid content mass ratio of 91:5:4, adding thereto N-methyl-2-pyrrolidone as a dispersion solvent so as to have a solid content of 68% by weight, and further mixing. The slurry solution was coated onto one side of a 15 µm-thick aluminum foil such that a portion of the aluminum foil was exposed, and then the solvent was dried away to adjust the coating amount to 175 g/m$^2$, followed by rolling with a roll press so that the density of the positive electrode mixture portion was 2.8 g/cm$^3$. Thereafter, a 30 mm×50 mm coated portion including the exposed portion of aluminum foil was cut to obtain a positive electrode.

b. Fabrication of Negative Electrode

A slurry solution was prepared by mixing artificial graphite as a negative electrode active material and styrene-butadiene rubber and carboxymethyl cellulose aqueous solution as binders at a solid content mass ratio of 96.4:1.9:1.7, adding thereto water as a dispersion solvent so as to have a solid content of 50% by weight, and further mixing. The slurry solution was coated onto one side of a 10 µm-thick copper foil such that a portion of the copper foil was exposed, and then the solvent was dried away to adjust the coating amount to 86 g/m$^2$, followed by rolling with a roll press so that the density of the negative electrode mixture portion was 1.45 g/cm$^3$. Thereafter, a 32 mm×52 mm coated portion including the exposed portion of copper foil was cut to obtain a negative electrode.

c. Preparation of Nonaqueous Electrolyte Solution

LiPF$_6$ was dissolved as a solute at a concentration of 1.0 mol/L in a mixed solvent of ethylene carbonate:ethylmethyl carbonate=1:2 (volume ratio) and 1.0% by weight of vinylene carbonate was further added thereto to prepare a nonaqueous electrolyte solution.

d. Battery Assembly

A 60 mm×40 mm rectangle was cut from a separator as a sample.

A laminated body consisting of 15 double-sided negative electrodes, 14 double-sided positive electrodes, and a long separator having a width of 55 mm folded in a zigzag fashion, such that the active material surfaces of a positive electrode and a negative electrode face each other and the separator are interposed between a positive electrode and a negative electrode, was fabricated. At this time, the inorganic porous layer of the sample was arranged so as to face a positive electrode.

An aluminum lead piece with a sealant was welded to the exposed aluminum foil portions of the 14 positive electrodes, and a nickel lead piece with a sealant was welded to the exposed copper foil portions of the 15 negative electrodes. Thereafter, the laminated body was inserted into an aluminum laminate outer packaging, and a total of three sides, the side where the positive and negative lead pieces are exposed and two other sides, were laminated and sealed. Next, the nonaqueous electrolyte solution was injected into the outer packaging, after which the opening was sealed to fabricate a 28 alternating laminated battery. After allowing to stand at room temperature for 1 day, the obtained battery was subjected to initial charging for a total of 8 h by a method of charging to a battery voltage of 4.2 V at a constant current of 330 mA (0.3 C) in an atmosphere of 25° C. and, after reaching that voltage, maintaining and charging at a constant voltage of 4.2 V. Subsequently, the battery was discharged to a battery voltage of 3.0 V at a current value of 330 mA (0.3 C).

Evaluation of Battery Cycle Stability 2

The battery obtained in the above "d. Battery assembly" was charged and discharged for 1000 cycles in an atmosphere of 25° C. The battery was subjected to charging for a total of 3 h by a method of charging to a battery voltage of 4.2 V at a current value of 1 mA (1.0 C) and, after reaching that voltage, maintaining and charging at a constant voltage of 4.2 V. The battery was then discharged to a battery voltage of 3.0 V at a current value of 1 mA (1.0 C). The capacity retention rate (%) was calculated from the discharge capacity at the 1000$^{th}$ cycle and the first cycle. When the capacity retention rate in the battery cycle stability was high, the battery was evaluated as having satisfactory cycle characteristic.

Safety Test 2 Against Destruction of Battery (Battery Destruction Test 2)

The safety test is a test in which an iron nail is driven into a battery charged to 4.5 V at a speed of 30 mm/sec and penetrates the battery to cause an internal short circuit. This test can measure the time-dependent change behavior of voltage reduction of the battery and the battery surface temperature increase behavior due to an internal short circuit to elucidate these phenomena during an internal short circuit. Rapid heat generation of the battery may be caused by an insufficient shutdown function or membrane rupture at low temperature during an internal short circuit. Consequently, the electrolyte solution may ignite, and the battery may emit smoke and/or explode.

(13) Measurement 2 of Shutdown and Membrane Rupture Temperatures (Fuse/Meltdown (F/MD) Characteristic 2)

In Examples 28 to 41 and Comparative Examples 30 to 44, the F/MD characteristic was measured as follows.

A positive electrode, a separator, and a negative electrode were cut into circular shapes having a diameter of 200 mm, stacked to obtain a laminated body, and soaked entirely in an electrolyte solution added thereto. The laminated body was interposed in the center of a circular aluminum heater having a diameter of 600 mm, and the aluminum heater was pressed at 0.5 MPa from above and below with hydraulic jacks to complete the preparation for measurement. The resistance (Ω) between the electrodes was measured while heating the laminated body with the aluminum heater at a heating rate of 2° C./min. The temperature at which the resistance between the electrodes of the fuse of the separator increased and exceeded 1000 Ψ for the first time was defined the fuse temperature (shutdown temperature). Heating was further continued, and the temperature at which the resistance decreased to 1000 Ψ or less was defined as the meltdown temperature (membrane rupture temperature). Regarding the measurement, a wire for resistance measurement was attached with a conductive silver paste to the back of the aluminum foil of the positive electrode fabricated in the section "a. Fabrication of positive electrode" of the above (12). Further, regarding the measurement, a wire for resistance measurement was attached with a conductive silver paste to the back of the copper foil of the negative electrode fabricated in the section "b. Fabrication of negative electrode" of the above (12). Furthermore, regarding the measurement, the electrolyte solution prepared in the section "c. Preparation of nonaqueous electrolyte solution" of the above (12) was used for the F/MD characteristic test.

TABLE 5

| | | | | | Example 28 | Example 29 | Example 30 | Example 31 |
|---|---|---|---|---|---|---|---|---|
| Separator | Microporous membrane | Resin composition | Polyethylene (A) | Mass ratio | 0.8 | 0.8 | 0.8 | 0.8 |
| | | | Silane-modified polyethylene (B) | Mass ratio | 0.2 | 0.2 | 0.2 | 0.2 |
| | | Membrane thickness | | μm | 11.0 | 12.0 | 12.5 | 12.5 |
| | | Surface roughness | | μm | 0.35 | 0.35 | 0.35 | 0.35 |
| | | Porosity | | % | 50 | 51 | 52 | 48 |
| | | Air permeability | | sec/100 cm³ | 140 | 145 | 143 | 150 |
| | Inorganic porous layer | Inorganic particle | Weight ratio | wt % | 94.60 | 94.60 | 97.50 | 94.60 |
| | | | Dispersant | wt % | 0.40 | 0.40 | 0.40 | 0.40 |
| | | | Type | — | AlO(OH) | AlO(OH) | AlO(OH) | AlO(OH) |
| | | Resin binder functional group | Type | — | Carboxyl | Carboxyl | Carboxyl | Carboxyl |
| | | | Addition ratio (solid content) | wt % | 2 | 2 | 2 | 2 |
| | | Crosslinking agent functional group | Type | — | Oxazoline | Oxazoline | Oxazoline | Carbodiimide |
| | | | Addition ratio (solid content) | wt % | 3 | 3 | 0.1 | 3 |
| | | Membrane thickness | | μm | 2 | 6 | 2 | 2 |
| | Solvent immersion test: percentage of peeled area | | | % | 2.2 | 2.5 | 1.2 | 3.2 |
| | Shutdown temperature 2 | | | ° C. | 139 | 138 | 142 | 142 |
| | Membrane rupture temperature 2 | | | ° C. | >200 | >200 | >200 | >200 |
| | Increase in air permeability after coating | | | sec/100 cm³ | 31 | 88 | 25 | 30 |
| Battery | Battery cycle stability 2 | | | % | 99 | 99 | 88 | 97 |
| | Battery destruction test 2 | Maximum heat generation rate | | ° C./sec | 5 | 2 | 9 | 7 |
| | | Voltage drop (time for drop to 3 V) | | sec | >300 | >300 | >300 | >300 |

| | | | | | Example 32 | Example 33 | Example 34 | Example 35 |
|---|---|---|---|---|---|---|---|---|
| Separator | Microporous membrane | Resin composition | Polyethylene (A) | Mass ratio | 0.8 | 0.8 | 0.8 | 0.8 |
| | | | Silane-modified polyethylene (B) | Mass ratio | 0.2 | 0.2 | 0.2 | 0.2 |
| | | Membrane thickness | | μm | 11.5 | 10.5 | 10.5 | 12.0 |
| | | Surface roughness | | μm | 0.35 | 0.35 | 0.35 | 0.35 |
| | | Porosity | | % | 45 | 49 | 52 | 52 |
| | | Air permeability | | sec/100 cm³ | 157 | 135 | 133 | 157 |
| | Inorganic porous layer | Inorganic particle | Weight ratio | wt % | 94.60 | 94.60 | 94.60 | 94.60 |
| | | | Dispersant | wt % | 0.40 | 0.40 | 0.40 | 0.40 |
| | | | Type | — | AlO(OH) | AlO(OH) | AlO(OH) | AlO(OH) |
| | | Resin binder functional group | Type | — | Hydroxyl | Hydroxyl | Carboxyl | Carboxyl |
| | | | Addition ratio (solid content) | wt % | 2 | 2 | 2 | 2 |
| | | Crosslinking agent functional group | Type | — | Isocyanate | Epoxy | Alkoxysilane | Amine/Alkoxysilane |
| | | | Addition ratio (solid content) | wt % | 3 | 3 | 3 | 3 |
| | | Membrane thickness | | μm | 2 | 2 | 2 | 2 |
| | Solvent immersion test: percentage of peeled area | | | % | 5.2 | 3.1 | 6.5 | 10.5 |
| | Shutdown temperature 2 | | | ° C. | 141 | 141 | 142 | 143 |
| | Membrane rupture temperature 2 | | | ° C. | >200 | >200 | >200 | >200 |
| | Increase in air permeability after coating | | | sec/100 cm³ | 31 | 30 | 30 | 34 |
| Battery | Battery cycle stability 2 | | | % | 97 | 95 | 97 | 98 |
| | Battery destruction test 2 | Maximum heat generation rate | | ° C./sec | 7 | 5 | 6 | 8 |
| | | Voltage drop (time for drop to 3 V) | | sec | >300 | >300 | >300 | >300 |

| | | | | | Example 36 | Example 37 | Example 38 | Example 39 |
|---|---|---|---|---|---|---|---|---|
| Separator | Microporous membrane | Resin composition | Polyethylene (A) | Mass ratio | 0.8 | 0.8 | 0.8 | 0.8 |
| | | | Silane-modified polyethylene (B) | Mass ratio | 0.2 | 0.2 | 0.2 | 0.2 |
| | | Membrane thickness | | μm | 12.1 | 12.5 | 12.0 | 10.3 |
| | | Surface roughness | | μm | 0.35 | 0.34 | 0.22 | 2.81 |
| | | Porosity | | % | 52 | 55 | 47 | 48 |
| | | Air permeability | | sec/100 cm³ | 150 | 152 | 150 | 151 |
| | Inorganic porous layer | Inorganic particle | Weight ratio | wt % | 92.60 | 97.50 | 94.60 | 94.60 |
| | | | Dispersant | wt % | 0.40 | 0.40 | 0.40 | 0.40 |
| | | | Type | — | AlO(OH) | AlO(OH) | AlO(OH) | AlO(OH) |
| | | Resin binder functional group | Type | — | Carboxyl | Carboxyl | Carboxyl | Carboxyl |
| | | | Addition ratio (solid content) | wt % | 2 | 2 | 2 | 2 |
| | | Crosslinking agent functional group | Type | — | Alkoxysilane | Alkoxysilane | Oxazoline | Oxazoline |
| | | | Addition ratio (solid content) | wt % | 5 | 0.1 | 3 | 3 |
| | | Membrane thickness | | μm | 2 | 2 | 2 | 2 |

TABLE 5-continued

|  |  |  |  |  |  |  |  |
|---|---|---|---|---|---|---|---|
|  | Solvent immersion test: percentage of peeled area | % | 10.7 | 12 | 1.8 | 1.5 |
|  | Shutdown temperature 2 | ° C. | 142 | 142 | 145 | 142 |
|  | Membrane rupture temperature 2 | ° C. | >200 | >200 | >200 | >200 |
|  | Increase in air permeability after coating | sec/100 cm³ | 28 | 24 | 31 | 33 |
| Battery | Battery cycle stability 2 | % | 94 | 98 | 95 | 94 |
|  | Battery | Maximum heat generation rate | ° C./sec | 7 | 10 | 13 | 11 |
|  | destruction test 2 | Voltage drop (time for drop to 3 V) | sec | >300 | >300 | >300 | >300 |

TABLE 6

|  |  |  |  |  | Example 40 | Example 41 | Comparative Example 30 | Comparative Example 31 | Comparative Example 32 |
|---|---|---|---|---|---|---|---|---|---|
| Separator | Microporous membrane | Resin composition | Polyethylene (A) | Mass ratio | 0.8 | 0.8 | 0.8 | 0.0 | 1.0 |
|  |  |  | Silane-modified polyethylene (B) | Mass ratio | 0.2 | 0.2 | 0.2 | 1 | — |
|  |  | Membrane thickness |  | μm | 13.1 | 10.5 | 12.1 | 12.4 | 12.9 |
|  |  | Surface roughness |  | μm | 0.13 | 3.21 | 0.35 | 0.35 | 0.35 |
|  |  | Porosity |  | % | 53 | 51 | 48 | 43 | 47 |
|  |  | Air permeability |  | sec/100 cm³ | 123 | 158 | 157 | 191 | 180 |
|  | Inorganic porous layer | Inorganic particle | Weight ratio | wt % | 94.60 | 94.60 | 97.60 | 85.60 | 97.60 |
|  |  |  | Dispersant | wt % | 0.40 | 0.40 | 0.40 | 0.40 | 0.40 |
|  |  |  | Type | — | AlO(OH) | AlO(OH) | AlO(OH) | AlO(OH) | AlO(OH) |
|  |  | Resin binder functional group | Type | — | Carboxyl | Carboxyl | Carboxyl | Carboxyl | Carboxyl |
|  |  |  | Addition ratio (solid content) | wt % | 2 | 2 | 2 | 14 | 2 |
|  |  | Crosslinking agent functional group | Type | — | Oxazoline | Oxazoline | — | — | — |
|  |  |  | Addition ratio (solid content) | wt % | 3 | 3 | — | — | — |
|  |  | Membrane thickness |  | μm | 2 | 2 | 2 | 2 | 2 |
|  | Solvent immersion test: percentage of peeled area |  |  | % | 3.2 | 5.3 | 65 | 67 | 64 |
|  | Shutdown temperature 2 |  |  | ° C. | 142 | 141 | 142 | 141 | 140 |
|  | Membrane rupture temperature 2 |  |  | ° C. | >200 | >200 | 178 | 172 | 172 |
|  | Increase in air permeability after coating |  |  | sec/100 cm³ | 30 | 28 | 28 | 324 | 27 |
| Battery | Battery cycle stability 2 |  |  | % | 80 | 78 | 30 | 27 | 31 |
|  | Battery destruction test 2 | Maximum heat generator rate |  | ° C./sec | 17 | 21 | 55 | 56 | 63 |
|  |  | Voltage drop (time for drop to 3 V) |  | sec | 287 | 281 | 7 | 5 | 3 |

|  |  |  |  |  | Comparative Example 33 | Comparative Example 34 | Comparative Example 35 | Comparative Example 36 |
|---|---|---|---|---|---|---|---|---|
| Separator | Microporous membrane | Resin composition | Polyethylene (A) | Mass ratio | 1.0 | 1.0 | 1.0 | 1.0 |
|  |  |  | Silane-modified ethylene (B) | Mass ratio | — | — | — | — |
|  |  | Membrane thickness |  | μm | 13.2 | 10.8 | 10.0 | 10.2 |
|  |  | Surface roughness |  | μm | 0.35 | 0.35 | 0.35 | 0.35 |
|  |  | Porosity |  | % | 45 | 45 | 48 | 51 |
|  |  | Air permeability |  | sec/100 cm³ | 178 | 176 | 156 | 157 |
|  | Inorganic porous layer | Inorganic particle | Weight ratio | wt % | 97.60 | 89.60 | 97.60 | 95.60 |
|  |  |  | Dispersant | wt % | 0.40 | 0.40 | 0.40 | 0.40 |
|  |  |  | Type | — | AlO(OH) | AlO(OH) | AlO(OH) | AlO(OH) |
|  |  | Resin binder functional group | Type | — | Carboxyl | Carboxyl | Carboxyl | Carboxyl |
|  |  |  | Addition ratio (solid content) | wt % | 2 | 10 | 2 | 2 |
|  |  | Crosslinking agent functional group | Type | — | — | — | Zn colloid | Polyfunctional metal ion chelating compound (EDTA) |
|  |  |  | Addition ratio (solid content) | wt % | — | — | 2 | 2 |
|  |  | Membrane thickness |  | μm | 6 | 2 | 2 | 2 |
|  | Solvent immersion test: percentage of peeled area |  |  | % | 66 | 65 | 40 | 42 |
|  | Shutdown temperature 2 |  |  | ° C. | 141 | 143 | 142 | 142 |
|  | Membrane rupture temperature 2 |  |  | ° C. | 170 | 170 | 172 | 175 |
|  | Increase in air permeability after coating |  |  | sec/100 cm³ | 93 | 113 | 62 | 51 |

TABLE 6-continued

| Battery | Battery cycle stability 2 | | | % | 35 | 30 | 34 | 47 |
|---|---|---|---|---|---|---|---|---|
| | Battery destruction test 2 | Maximum heat generation rate | | °C./sec | 65 | 60 | 54 | 45 |
| | | Voltage drop (time for drop to 3 V) | | sec | 3 | 1 | 5 | 8 |

| | | | | | Comparative Example 37 | Comparative Example 38 | Comparative Example 39 |
|---|---|---|---|---|---|---|---|
| Separator | Microporous membrane | Resin composition | Polyethylene (A) | Mass ratio | 1.0 | 1.0 | 1.0 |
| | | | Silane-modified polyethylene (B) | Mass ratio | — | — | — |
| | | Membrane thickness | | μm | 10.8 | 12.0 | 10.7 |
| | | Surface roughness | | μm | 0.35 | 0.35 | 0.35 |
| | | Porosity | | % | 50 | 48 | 50 |
| | | Air permeability | | sec/100 cm³ | 150 | 148 | 154 |
| | Inorganic porous layer | Inorganic particle | Weight ratio | wt % | 95.60 | 87.60 | 87.60 |
| | | | Dispersant | wt % | 0.40 | 0.40 | 0.40 |
| | | | Type | | — | AlO(OH) | AlO(OH) | AlO(OH) |
| | | Resin binder functional group | Type | | Carboxyl | Carboxyl | Carboxyl |
| | | | Addition ratio (solid content) | wt % | 2 | 2 | 2 |
| | | Crosslinking agent functional group | Type | | — | Polyfunctional carboxylic acid compound (DOTA) | Polyfunctional metal ion chelating compound (EDTA) | Polyfunctional carboxylic acid compound (DOTA) |
| | | | Addition ratio (solid content) | wt % | 2 | 10 | 10 |
| | | Membrane thickness | | μm | 2 | 2 | 2 |
| | Solvent immersion test: percentage of peeled area | | | % | 38 | 41 | 39 |
| | Shutdown temperature 2 | | | °C. | 141 | 140 | 141 |
| | Membrane rupture temperature 2 | | | °C. | 178 | 174 | 178 |
| | Increase in air permeability after coating | | | sec/100 cm³ | 42 | 52 | 45 |
| Battery | Battery cycle stability 2 | | | % | 48 | 48 | 51 |
| | Battery destruction test 2 | Maximum heat generation rate | | °C./sec | 46 | 47 | 44 |
| | | Voltage drop (time for drop to 3 V) | | sec | 12 | 9 | 11 |

| | | | | | Comparative Example 40 | Comparative Example 41 | Comparative Example 42 | Comparative Example 43 | Comparative Example 44 |
|---|---|---|---|---|---|---|---|---|---|
| Separator | Microporous membrane | Resin composition | Polyethylene (A) | Mass ratio | 0.8 | 0.8 | 0.8 | 0.8 | 0.8 |
| | | | Silane-modified polyethylene (B) | Mass ratio | 0.2 | 0.2 | 0.2 | 0.2 | 0.2 |
| | | Membrane thickness | | μm | 12.7 | 12.8 | 11.2 | 11.0 | 13.1 |
| | | Surface roughness | | μm | 0.35 | 0.35 | 0.35 | 0.35 | 0.35 |
| | | Porosity | | % | 45 | 47 | 42 | 51 | 47 |
| | | Air permeability | | sec/100 cm³ | 170 | 121 | 105 | 150 | 145 |
| | Inorganic porous layer | Inorganic particle | Weight ratio | wt % | 97.60 | 95.60 | 95.60 | 87.60 | 87.60 |
| | | | Dispersant | wt % | 0.40 | 0.40 | 0.40 | 0.40 | 0.40 |
| | | | Type | | AlO(OH) | AlO(OH) | AlO(OH) | AlO(OH) | AlO(OH) |
| | | Resin binder functional group | Type | | Carboxyl | Carboxyl | Carboxyl | Carboxyl | Carboxyl |
| | | | Addition ratio (solid content) | wt % | 2 | 2 | 2 | 2 | 2 |
| | | Crosslinking agent functional group | Type | | Zn colloid | Polyfunctional metal ion chelating compound (EDTA) | Polyfunctional carboxylic acid compound (DOTA) | Polyfunctional metal ion chelating compound (EDTA) | Polyfunctional carboxylic acid compound (DOTA) |
| | | | Addition ratio (solid content) | wt % | 2 | 2 | 2 | 10 | 10 |
| | | Membrane thickness | | μm | 2 | 2 | 2 | 2 | 2 |
| | Solvent immersion test: percentage of peeled area | | | % | 42 | 39 | 41 | 43 | 41 |
| | Shutdown temperature 2 | | | °C. | 141 | 140 | 142 | 141 | 143 |
| | Membrane rupture temperature 2 | | | °C. | 181 | 182 | 180 | 182 | 180 |
| | Increase in air permeability after coating | | | sec/100 cm³ | 62 | 50 | 43 | 51 | 47 |
| Battery | Battery cycle stability 2 | | | % | 35 | 43 | 51 | 54 | 47 |
| | Battery destruction test 2 | Maximum heat generator rate | | °C./sec | 42 | 40 | 41 | 38 | 36 |
| | | Voltage drop (time for drop to 3 V) | | sec | 14 | 11 | 13 | 17 | 16 |

The invention claimed is:

1. A separator for an electricity storage device, comprising a polyolefin resin microporous membrane and an inorganic porous layer arranged on at least one surface of the polyolefin resin microporous membrane, wherein
the inorganic porous layer contains an inorganic particle and a resin binder,
a number-average particle size of the inorganic particle is 0.3 μm or more and 10.0 μm or less,
the inorganic porous layer has at least one of (i) covalent bonding between the inorganic particles, and (iii) covalent bonding between the inorganic particle and the resin binder, and
the polyolefin resin microporous membrane comprises a silane graft-modified polyolefin, and a silane crosslinking reaction in the silane graft-modified polyolefin is initiated when the separator for an electricity storage device is brought into contact with an electrolyte solution.

2. The separator for an electricity storage device according to claim 1, wherein the electrolyte solution is nonaqueous and contains a fluorine (F)-containing lithium salt.

3. The separator for an electricity storage device according to claim 1, wherein the inorganic porous layer comprises a crosslinked structure.

4. The separator for an electricity storage device according to claim 1, wherein
in a solvent immersion test, an area where the inorganic porous layer is peeled off from the polyolefin resin microporous membrane is 0 to 35% based on the area of the inorganic porous layer before the test.

5. The separator for an electricity storage device according to claim 4,
wherein the inorganic porous layer comprises a crosslinked structure formed by at least one of the covalent bondings (i) and (iii).

6. The separator for an electricity storage device according to claim 4,
wherein a region facing the inorganic porous layer of the polyolefin resin microporous membrane has a surface roughness of 0.2 to 3.0 μm.

7. The separator for an electricity storage device according to claim 6,
wherein the electrolyte solution is nonaqueous and contains a fluorine (F)-containing lithium salt.

8. The separator for an electricity storage device according to claim 3, wherein the crosslinked structure in the inorganic porous layer is formed by at least one selected from the group consisting of a nucleophilic substitution reaction, a nucleophilic addition reaction, an electrophilic addition reaction, and a silane coupling reaction, or
wherein the resin binder is in the form of an emulsion, a suspension, or a colloid.

9. The separator for an electricity storage device according to claim 1, wherein the resin binder has a nucleophilic substitution- or nucleophilic addition-reactive functional group,
wherein the nucleophilic substitution- or nucleophilic addition-reactive functional group of the resin binder is at least one selected from the group consisting of a carboxyl group, a hydroxy group, and an amino group.

10. The separator for an electricity storage device according to claim 1, wherein the inorganic porous layer comprises an inorganic particle and has a polar functional group on a surface of the inorganic particle.

11. The separator for an electricity storage device according to claim 1, wherein the inorganic porous layer has a silicon-containing functional group on a surface of the inorganic particle,
wherein the silicon-containing functional group is at least one selected from the group consisting of an alkoxysilane group, a halogen-substituted silane group, and a silazane group.

12. The separator for an electricity storage device according to claim 1, wherein the inorganic porous layer comprises a crosslinking agent,
wherein the crosslinking agent has a nucleophilic substitution-reactive functional group and/or an electrophilic addition-reactive functional group.

13. The separator for an electricity storage device according to claim 12, wherein the nucleophilic substitution-reactive functional group of the crosslinking agent is an oxazoline group and/or an epoxy group,
wherein the electrophilic addition-reactive functional group of the crosslinking agent is at least one selected from the group consisting of an isocyanate group, a thioisocyanate group, a carbodiimide group, an allene group, an oxime group, and a carbonyl group.

14. An electricity storage device comprising an electrode, an electrolyte solution, and the separator for an electricity storage device according to claim 1.

15. A secondary battery comprising an electrode, an electrolyte solution, and the separator for an electricity storage device according to claim 1.

16. A separator for an electricity storage device, comprising a polyolefin resin microporous membrane and an inorganic porous layer arranged on at least one surface of the polyolefin resin microporous membrane, wherein the inorganic porous layer contains an inorganic particle and a resin binder, a number-average particle size of the inorganic particle is 0.3 μm or more and 10.0 μm or less, the inorganic porous layer has (ii) covalent bonding between resin binders, and the polyolefin resin microporous membrane comprises a silane graft-modified polyolefin, and a silane crosslinking reaction in the silane graft-modified polyolefin is initiated when the separator for an electricity storage device is brought into contact with an electrolyte solution.

17. An electricity storage device comprising an electrode, an electrolyte solution, and the separator for an electricity storage device according to claim 16.

18. A secondary battery comprising an electrode, an electrolyte solution, and the separator for an electricity storage device according to claim 16.

* * * * *